(12) United States Patent
Vijayan et al.

(10) Patent No.: US 12,519,607 B2
(45) Date of Patent: Jan. 6, 2026

(54) CLOCK SYNCHRONIZATION AND POLARIZATION TRACKING IN OPTICAL COMMUNICATION SYSTEMS

(71) Applicant: Nokia Solutions and Networks Oy, Espoo (FI)

(72) Inventors: Kovendhan Vijayan, Edison, NJ (US); Robert Borkowski, Berkeley Heights, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 295 days.

(21) Appl. No.: 18/469,524

(22) Filed: Sep. 18, 2023

(65) Prior Publication Data

US 2025/0097002 A1 Mar. 20, 2025

(51) Int. Cl.
*H04L 7/00* (2006.01)
*H04Q 11/00* (2006.01)

(52) U.S. Cl.
CPC .......... *H04L 7/0075* (2013.01); *H04L 7/0008* (2013.01); *H04Q 11/0067* (2013.01)

(58) Field of Classification Search
CPC .. H04L 7/0008; H04L 7/0075; H04Q 11/0067
USPC .......................................................... 398/66
See application file for complete search history.

(56) References Cited

U.S. PATENT DOCUMENTS

| 7,483,506 B2* | 1/2009 | Yajima | H04L 7/0337 375/365 |
| 7,519,750 B2* | 4/2009 | Scouten | H03L 7/0807 713/400 |
| 8,488,965 B2* | 7/2013 | Mizutani | H04J 3/0682 398/43 |

(Continued)

FOREIGN PATENT DOCUMENTS

WO 2018198873 A1 11/2018

OTHER PUBLICATIONS

Extended European Search Report, corresponding EP Application No. 24200978.5-1206, dated Feb. 14, 2025, 9 pages.

(Continued)

*Primary Examiner* — Dalzid E Singh
(74) *Attorney, Agent, or Firm* — Tong, Rea, Bentley & Kim, LLC

(57) ABSTRACT

Various example embodiments for supporting optical communications in an optical communication system are presented. Various example embodiments for supporting optical communications in an optical communication system may be configured to support optical communications in a passive optical network (PON). Various example embodiments for supporting optical communications in an optical communication system such as a PON may be configured to support clock synchronization in the PON and polarization tracking in the PON. Various example embodiments for supporting optical communications in a PON may be configured to support joint clock synchronization and polariza- (Continued)

tion tracking the PON. Various example embodiments for supporting optical communications in an optical communication system such as a PON may be configured to support clock synchronization in the PON and polarization tracking in the PON, along with various other functions (e.g., symbol rate sampling and so forth).

20 Claims, 18 Drawing Sheets

(56) References Cited

U.S. PATENT DOCUMENTS

| | | | | |
|---|---|---|---|---|
| 9,231,754 | B2* | 1/2016 | Wei | H04J 3/0638 |
| 12,107,668 | B1* | 10/2024 | Zhang | H04J 14/0298 |
| 2004/0067063 | A1 | 4/2004 | Lee et al. | |
| 2017/0063481 | A1* | 3/2017 | Pauwels | H04J 3/0673 |
| 2018/0034579 | A1* | 2/2018 | Liu | H04Q 11/0067 |
| 2021/0013971 | A1* | 1/2021 | Hara | H04B 10/541 |
| 2022/0085886 | A1 | 3/2022 | Hijimiri | |

OTHER PUBLICATIONS

Lee et al., "Enhancement of clock component in a nonreturn-to-zero signal through beating process," Optical Fiber Technology 12, Elsevier, published in 2006, 12 pages.

N. Stojanović and Xu Chuan, "Clock recovery in coherent optical receivers," 2015 Optical Fiber Communications Conference and Exhibition (OFC), Los Angeles, CA, USA, 2015, pp. 1-3, doi: 10.1364/OFC.2015.Th3G.4.

Xuefeng Wang, Yifan Zeng, Ruolin Liao, Can Zhao, and Ming Tang, "Reset-free adaptive polarization controller on a silicon-photonic platform for a self-coherent communication system," Opt. Lett. 48, 1546-1549 (2023).

H. Zhang, "Power Efficient Coherent Detection for Short-Reach System," in Optical Fiber Communication Conference (OFC) 2023, Technical Digest Series (Optica Publishing Group, 2023), paper M1E.1.

M. Zhang, W. Li, Y. Chen, Z. Hu, and M. Tang, "Self-Homodyne Coherent Transmission with All-Optical Clock Synchronization for DSP-Free Co-Packaged Optics," in Optical Fiber Communication Conference (OFC) 2023, Technical Digest Series (Optica Publishing Group, 2023), paper M3E.3.

Z. Zhou, K. Clark, A. Verma, Y. Matsui, and Z. Liu, "Optical Clock Synchronization for O-band Directly Modulated Laser Based Data Center Interconnection," in Optical Fiber Communication Conference (OFC) 2023, Technical Digest Series (Optica Publishing Group, 2023), paper M3E.5.

Zichuan Zhou, Kari A. Clark, Callum Deakin, and Zhixin Liu, "Clock Synchronized Transmission of 51.2 GBd Optical Packets for Optically Switched Data Center Interconnects," J. Lightwave Technol. 40, 1735-1741 (2022).

U. Gliese, S. Norskov and T. N. Nielsen, "Chromatic dispersion in fiber-optic microwave and millimeter-wave links," in IEEE Transactions on Microwave Theory and Techniques, vol. 44, No. 10, pp. 1716-1724, Oct. 1996, doi: 10.1109/22.538964.

General Photonics, POS-002 Fiber-Optic Polarization Tracker Operation Manual, POS-002-Manual-V2-1-9-27-13.pdf (lunainc.com), pp. 27-29.

T. Miyazaki, "Linewidth-tolerant QPSK homodyne transmission using a polarization-multiplexed pilot carrier," in IEEE Photonics Technology Letters, vol. 18, No. 2, pp. 388-390, Jan. 15, 2006, doi: 10.1109/LPT.2005.862363.

W. Li, M. Zhang, Y. Zeng, Y. Chen, J. Chen, Y. Li, and M. Tang, "Gain-Clamped SOA Enabled Reach-Extended Self-Homodyne Coherent Bidirectional Transmission for Inter-DCI Applications," in European Conference on Optical Communication (ECOC) 2022, J. Leuthold, C. Harder, B. Offrein, and H. Limberger, eds., Technical Digest Series (Optica Publishing Group, 2022), paper We2A.3.

Tao Gui, Xuefeng Wang, Ming Tang, Yi Yu, Yanzhao Lu, and Liangchuan Li, "Real-Time Demonstration of Homodyne Coherent Bidirectional Transmission for Next-Generation Data Center Interconnects," J. Lightwave Technol. 39, 1231-1238 (2021).

Z. Feng, L. Xu, Q. Wu, M. Tang, S. Fu, W. Tong, and D. Liu, "Large-Capacity Optical Access Network Utilizing Multicore Fiber and Self-Homodyne Coherent Detection," in Optical Fiber Communication Conference, OSA Technical Digest (online) (Optica Publishing Group, 2017), paper Th1K.2.

* cited by examiner

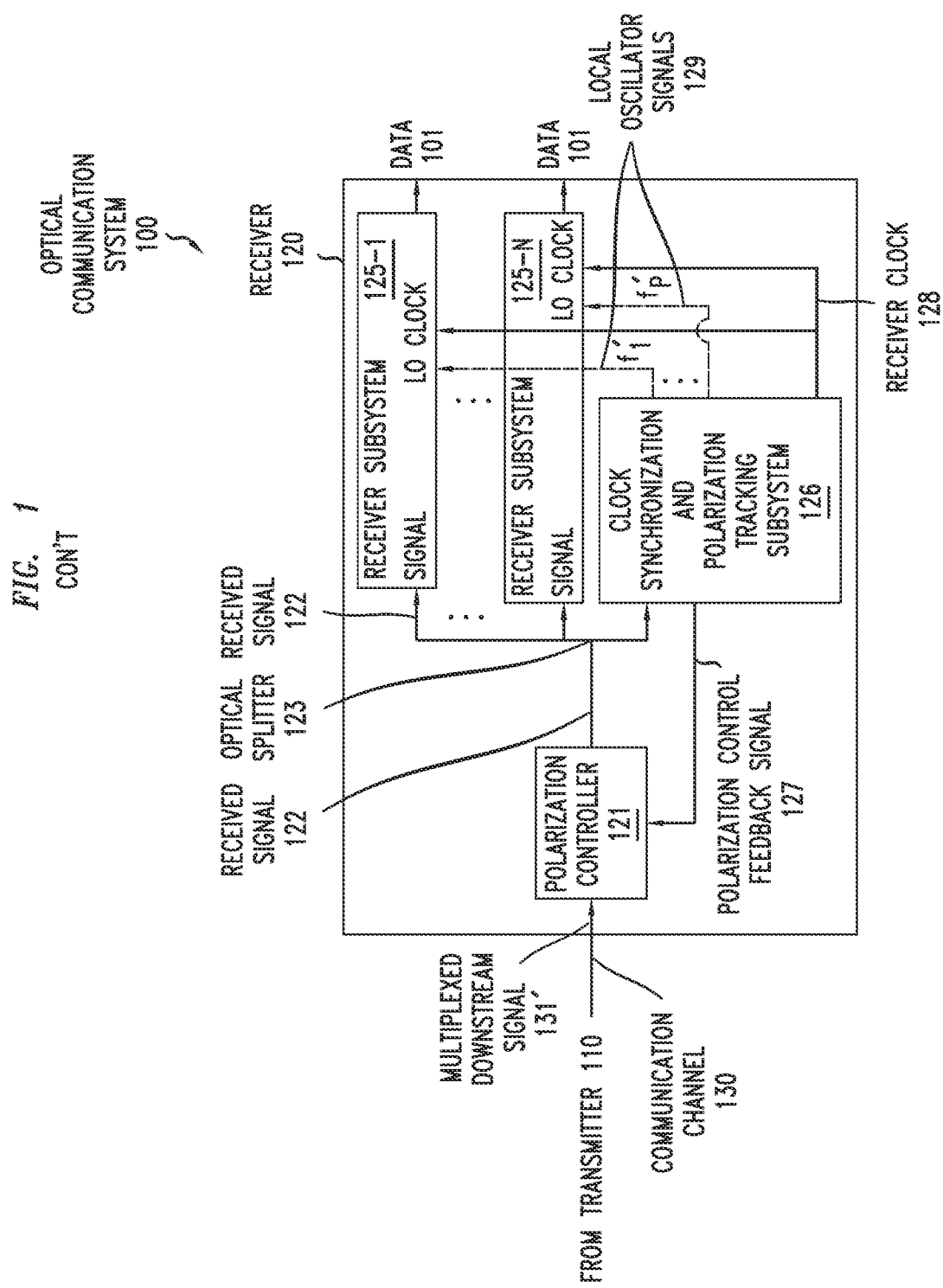
FIG. 1 CON'T

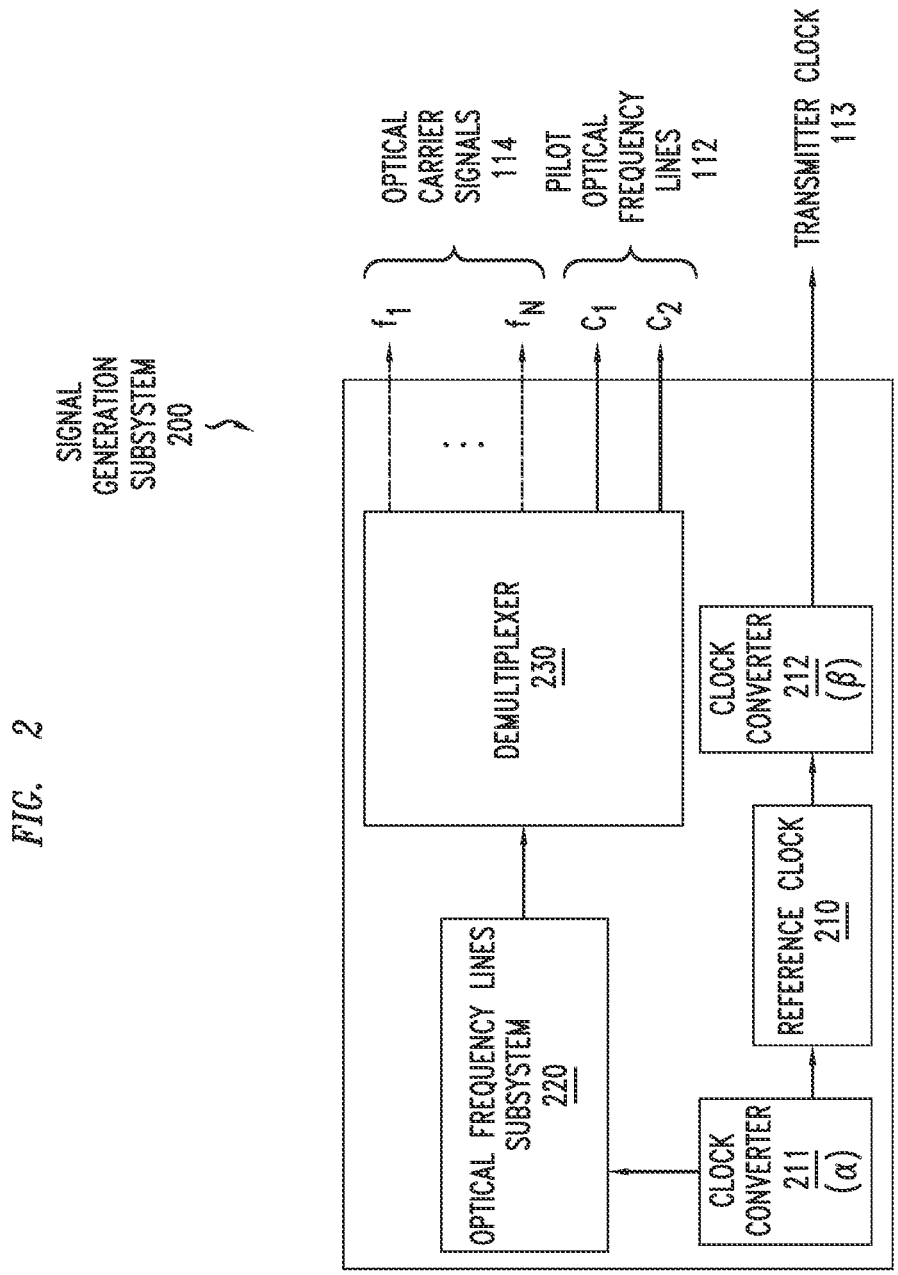

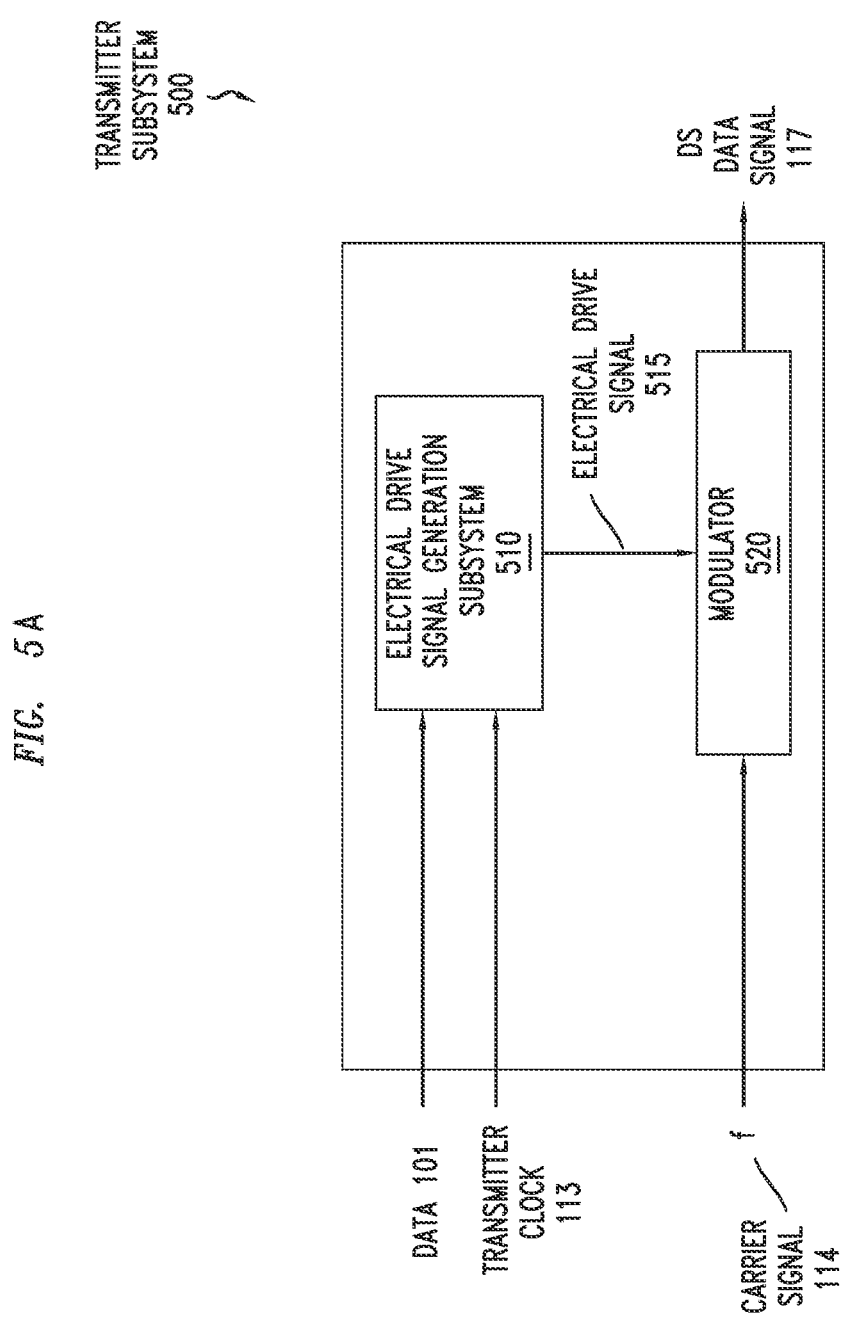

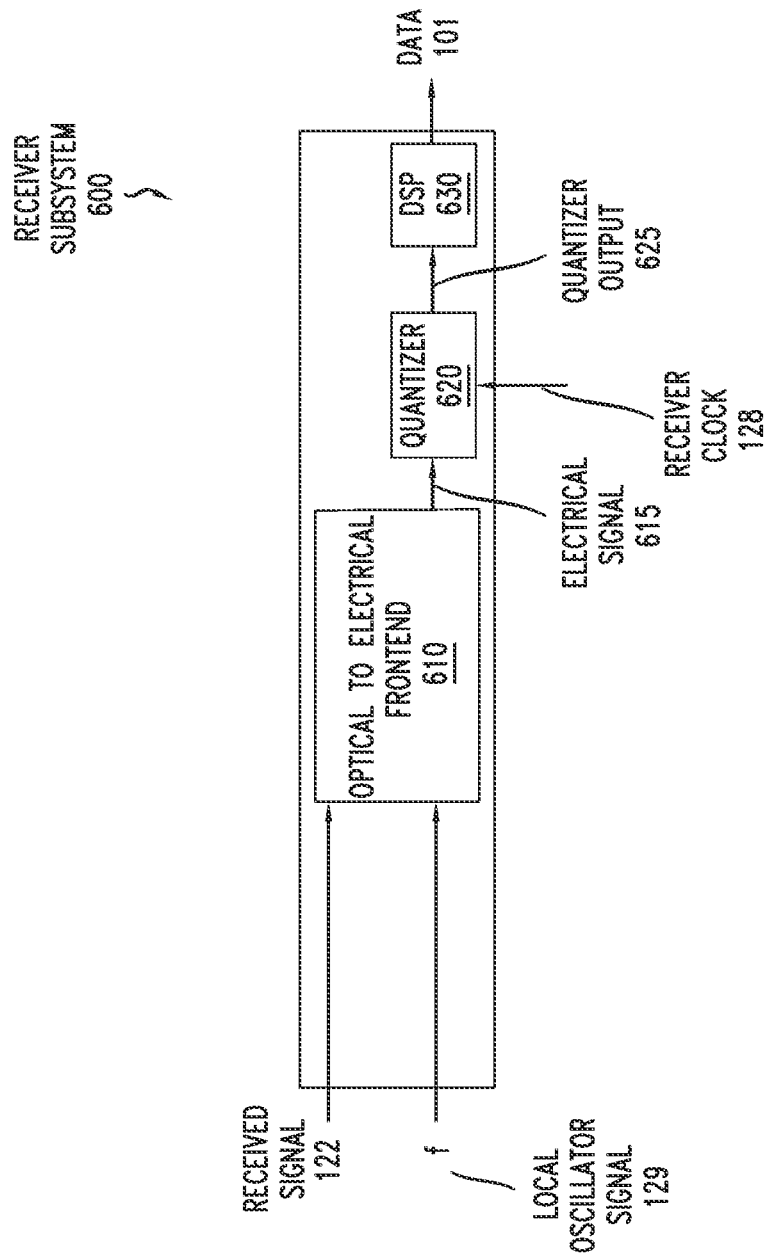

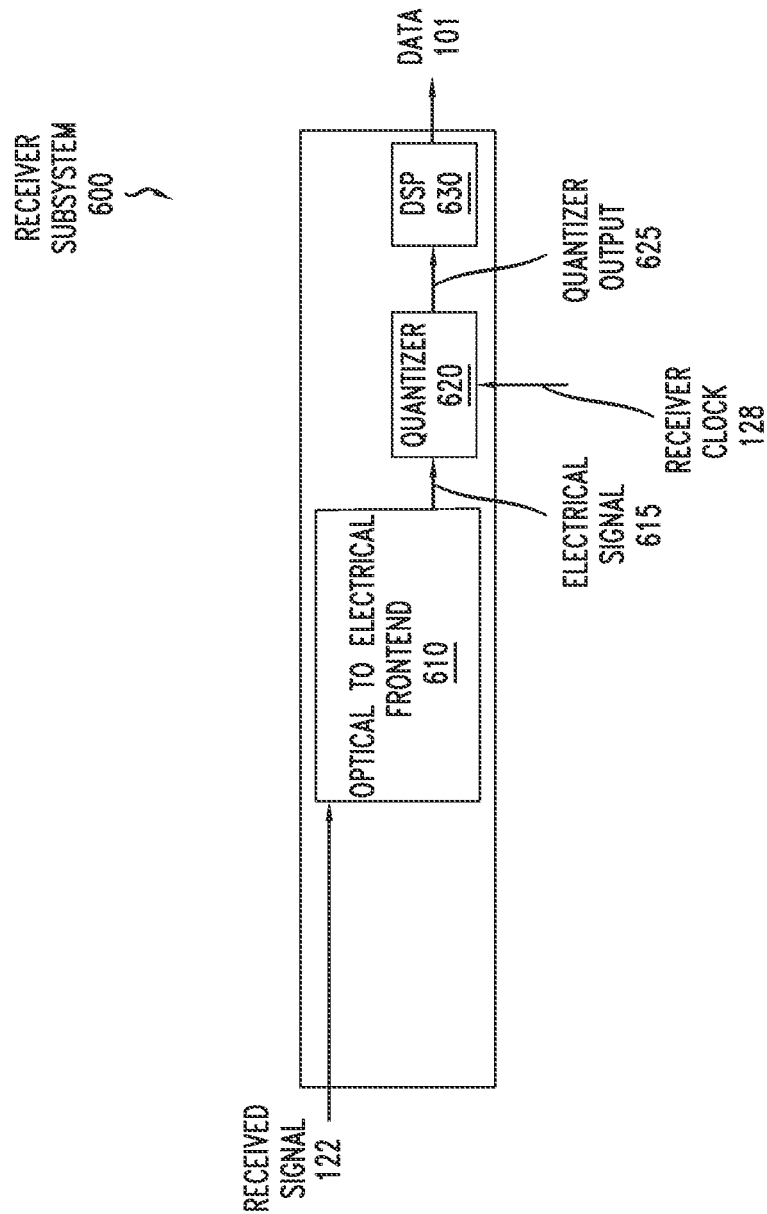

CLOCK SYNCHRONIZATION AND POLARIZATION TRACKING IN OPTICAL COMMUNICATION SYSTEMS

TECHNICAL FIELD

Various example embodiments relate generally to communication systems and, more particularly but not exclusively, to supporting communications in optical communication systems.

BACKGROUND

Various communications technologies may be used to support communications in various types of communication systems.

SUMMARY

In at least some example embodiments, an apparatus includes a subsystem configured to generate a set of pilot optical frequency lines and a transmitter clock, wherein the transmitter clock is based on a frequency separation between at least two pilot optical frequency lines of the set of pilot optical frequency lines, a set of transmitter subsystems configured to generate a set of downstream data signals based on the transmitter clock, and a multiplexer configured to multiplex the set of pilot optical frequency lines and the set of downstream data signals for transmission via an optical communication channel. In at least some example embodiments, the set of pilot optical frequency lines is configured to carry clock information configured for use in generating a receiver clock at a receiver of the communication channel. In at least some example embodiments, the subsystem is configured to generate the set of pilot optical frequency lines and the transmitter clock based on a reference clock. In at least some example embodiments, the subsystem is configured to generate the set of pilot optical frequency lines by converting the reference clock, based on a conversion factor, to form a drive signal used for generation of a set of optical frequency lines that at least includes the set of pilot optical frequency lines. In at least some example embodiments, the subsystem is configured to generate the transmitter clock by converting the reference clock, based on a conversion factor, to provide the transmitter clock. In at least some example embodiments, the subsystem is configured to generate a set of optical frequency lines that includes the set of pilot optical frequency lines, and the subsystem is configured to generate the transmitter clock based on at least a portion of the optical frequency lines in the set of optical frequency lines. In at least some example embodiments, the subsystem is configured to generate a set of optical frequency lines that includes a set of communication optical frequency lines and the set of pilot optical frequency lines, and the transmitter subsystems are configured to generate the downstream data signals based on use of the communication optical frequency lines as optical carrier signals. In at least some example embodiments, the multiplexer is configured to perform polarization multiplexing of the downstream data signals. In at least some example embodiments, the transmitter clock is synchronized to a symbol rate of the downstream data signals. In at least some example embodiments, the apparatus is configured for use in an optical line terminal (OLT). In at least some example embodiments, a method includes generating a set of pilot optical frequency lines and a transmitter clock, wherein the transmitter clock is based on a frequency separation between at least two pilot optical frequency lines of the set of pilot optical frequency lines, generating a set of downstream data signals based on the transmitter clock, and multiplexing the set of pilot optical frequency lines and the set of downstream data signals for transmission via an optical communication channel. In at least some example embodiments, an apparatus includes means for generating a set of pilot optical frequency lines and a transmitter clock, wherein the transmitter clock is based on a frequency separation between at least two pilot optical frequency lines of the set of pilot optical frequency lines, means for generating a set of downstream data signals based on the transmitter clock, and means for multiplexing the set of pilot optical frequency lines and the set of downstream data signals for transmission via an optical communication channel. In at least some example embodiments, an apparatus includes a subsystem configured to receive a multiplexed optical signal including a set of pilot optical frequency lines and a set of downstream data signals, and generate a receiver clock based on the set of pilot optical frequency lines, and a set of receiver subsystems configured to receive the set of downstream data signals and recover downstream data from the set of downstream data signals based on the receiver clock. In at least some example embodiments, the set of pilot optical frequency lines is configured to carry clock information configured for use in generating the receiver clock. In at least some example embodiments, the subsystem is configured to generate the receiver clock based on a frequency separation between the pilot optical frequency lines in the set of optical frequency lines. In at least some example embodiments, the receiver clock is correlated to a transmitter clock used for generation of the downstream data signals. In at least some example embodiments, the subsystem is configured to generate a set of communication optical frequency lines based on at least a portion of the pilot optical frequency lines in the set of pilot optical frequency lines, and the receiver subsystems are configured to recover the downstream data from the downstream data signals based on use of the communication optical frequency lines as local oscillator signals. In at least some example embodiments, the subsystem is configured to generate a polarization control feedback signal based on at least a portion of the pilot optical frequency lines in the set of pilot optical frequency lines, and the subsystem is configured to provide the polarization control feedback signal to a polarization controller configured to align polarization state of the downstream data signals based on the polarization control feedback signal. In at least some example embodiments, the receiver clock is synchronized to a symbol rate of the downstream data signals. In at least some example embodiments, the apparatus is configured for use in an optical network unit (ONU). In at least some example embodiments, a method includes receiving a multiplexed optical signal including a set of pilot optical frequency lines and a set of downstream data signals, generating a receiver clock based on the set of pilot optical frequency lines, and recovering downstream data from the set of downstream data signals based on the receiver clock. In at least some example embodiments, an apparatus includes means for receiving a multiplexed optical signal including a set of pilot optical frequency lines and a set of downstream data signals, means for generating a receiver clock based on the set of pilot optical frequency lines, and means for recovering downstream data from the set of downstream data signals based on the receiver clock.

BRIEF DESCRIPTION OF THE DRAWINGS

The teachings herein can be readily understood by considering the following detailed description in conjunction with the accompanying drawings, in which:

FIG. 2 depicts an example embodiment of a signal generation subsystem for use in the transmitter of the optical communication system of FIG. 1;

FIGS. 5A-5D depict example embodiments of a transmitter subsystem for use in the transmitter of the optical communication system of FIG. 1;

FIGS. 6A-6D depict example embodiments of a receiver subsystem for use in the receiver of the optical communication system of FIG. 1;

To facilitate understanding, identical reference numerals have been used herein, wherever possible, in order to designate identical elements that are common among the various figures.

DETAILED DESCRIPTION

Figure 1:
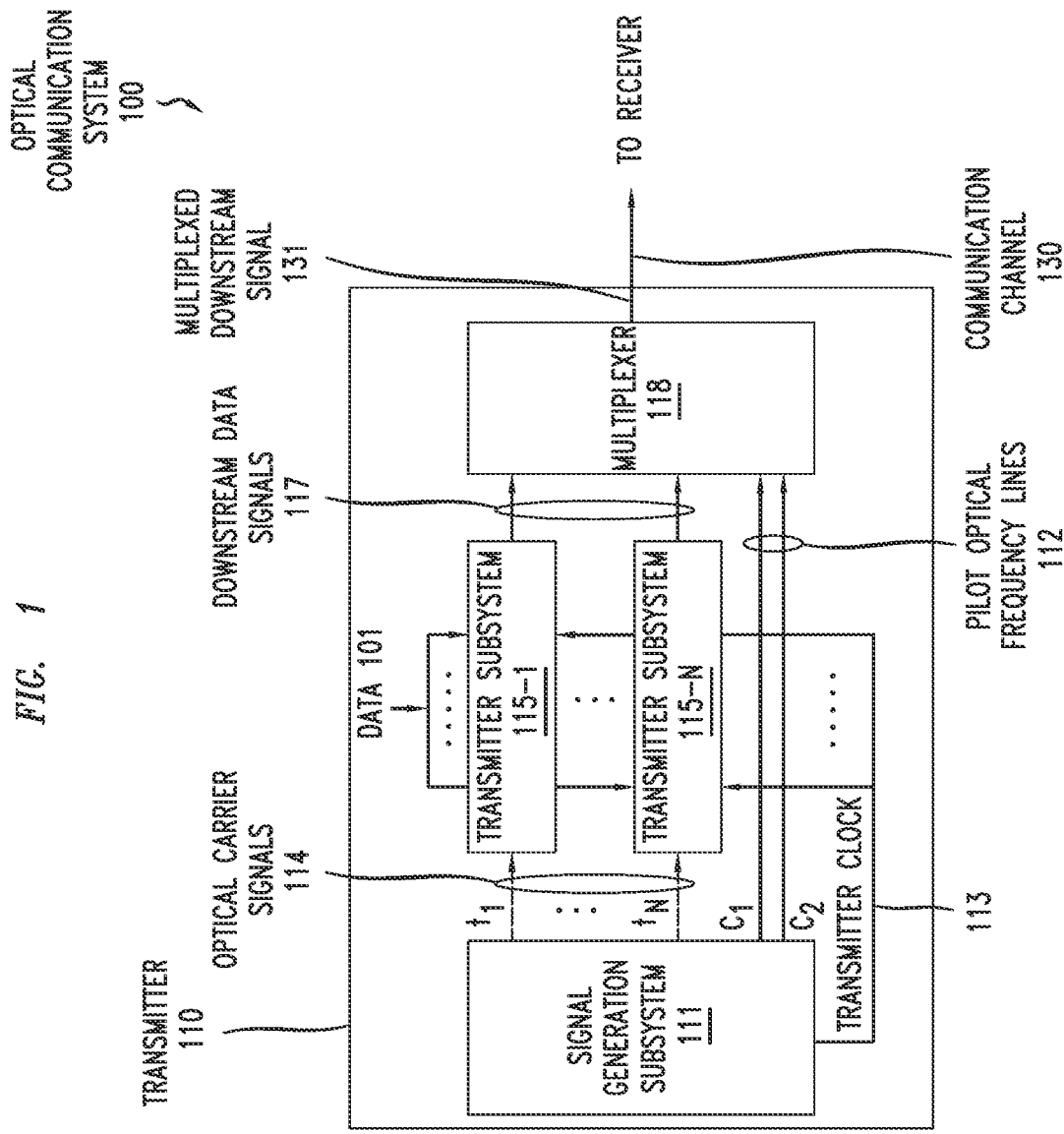
FIG. 1 depicts an example embodiment of an optical communication system, including a transmitter and a receiver, which is configured to support clock recovery and polarization tracking based on a set of pilot optical frequency lines provided from the transmitter to the receiver.

Various example embodiments for supporting optical communications in an optical communication system are presented. Various example embodiments for supporting optical communications in an optical communication system may be configured to support optical communications in a passive optical network (PON). Various example embodiments for supporting optical communications in a PON may be configured to support clock synchronization in the PON. Various example embodiments for supporting optical communications in a PON may be configured to support polarization tracking in the PON. Various example embodiments for supporting optical communications in a PON may be configured to support joint clock synchronization and polarization tracking in the PON. Various example embodiments for supporting joint clock synchronization and polarization tracking in a PON may be configured to support joint clock synchronization and polarization tracking in the PON in combination with synchronization of the signal carrier and local oscillator (homodyne detection). Various example embodiments for supporting joint clock synchronization and polarization tracking in a PON may be configured to support joint clock synchronization and polarization tracking in the PON in a manner that supports operation of the PON as a DSP-light or even DSP-free coherent PON with symbol rate sampling (where "symbol rate" also may be referred to as "baud rate"). Various example embodiments for supporting joint clock synchronization and polarization tracking in a PON may be applied within PONs which utilize various types of detection, such as PONs which use direct detection, PONs which use coherent detection, or the like. Various example embodiments for supporting joint clock synchronization and polarization tracking in a PON may be applied within various types of PONs which may be based on various PON specifications (ITU-T G.9804 for 50G PON, the ITU0-T G.VHSP (Very High Speed PON) project currently active in ITU-T Q2/15 for >100 Gbit/s PON, or the like). It will be appreciated that these example embodiments, as well as various other example embodiments, may be further understood by first considering various aspects of PON systems more generally, such as clock recovery, polarization tracking, and direct and coherent reception.

Clock recovery refers to the process of extracting receiver clock from the received signal. There exist multiple strategies for performing clock recovery, which vary depending on detection type. There are two major types of signal detection in optical systems: (i) coherent detection, and (ii) direct detection. In some implementations of coherent detection, the signal is oversampled at a >1 sample per symbol fractional rate (e.g., 4/3) and residual clock offset is compensated by, for example, a frequency-domain-based timing phase compensation block, followed by a subsequent multirate filter, which resamples the signal to 1 sample per symbol. In some implementations of direct detection, especially at rates faster than 10 Gbit/s, the signal is usually sampled at 1 sample per symbol, and the phase of the sampling circuit is adjusted using a feedback signal controlled by a phase detection (e.g., a Mueller and Müller phase detector); however, it will be appreciated direction detection also may be based on architectures which implement the phase detector block based on oversampled signals. In any case, the quality of the recovered receiver clock is subject to transmitter and receiver clock jitters and data quality (thus affected by both bandwidth limitation and chromatic dispersion—or in case of coherent detection—residual chromatic dispersion and polarization mode dispersion) and results in jitter of the recovered receiver clock, which subsequently translates into sensitivity penalty due to jitter of the sampling point (self-jitter). Additionally, some modulation formats, such as duobinary, do not even contain a clock tone that could be used for clock extraction from the signal using standard methods, posing a clock recovery challenge, and, further, some mixed modulation formats based on time division multiplexed (TDM) frames may present other challenges for clock recovery.

Clock recovery may be performed in a number of ways. One of the solutions is to use the transmitter clock as a receiver clock (explicit clock reference), which, although infeasible in practice, is employed in some experiments by simple electrical connection between the transmitter and the receiver. Another, more practical, solution is to co-propagate clock in parallel with data signal in the same optical channel, such as optical fiber or in free space, using another wavelength (out-of-band), or in another channel, such as a parallel optical fiber or a parallel fiber core of a multicore optical fiber. If decorrelation between clock and data due to path length mismatch and/or group velocity difference is small enough, which is the case for co-propagating signals, then the penalty of explicit clock reference delivered over fiber is minimal. This way, a full-rate or sub-rate intensity modulated clock can be delivered. This solution, however, generally suffers from dispersion-induced power fading if such clock is modulated as a double-sideband signal and detected using direct detection techniques.

Clock recovery that supports an accurate and high-quality clock, irrespective of system type, is important to achieve adequate system sensitivity. However, depending on distortions of the received data signal, the recovered clock will suffer from jitter and, therefore, further decrease the quality of the sampled signals (referred to as self-jitter). Additionally, some modulation formats, such as duobinary, entirely lack a clock tone, making standard clock recovery techniques not applicable for systems employing such modulation formats. Furthermore, as discussed further below, there are a number of other challenging cases for clock recovery, including, but not limited to, clock recovery for systems utilizing time division multiplexed (TDM) data signals employing different modulation format based on frames, clock recovery for systems utilizing coherent detection, and so forth.

Clock recovery, as indicated above, may be challenging in the case of TDM data signals employing different modulation format based on frames (e.g., mixed on-off keying (OOK)/high order Pulse Amplitude Modulation (PAM), such as those proposed for Flexible Rate PON (FLCS-PON)), especially for receivers in low signal-to-noise ratio (SNR) conditions. For example, the advantage of mixed modulation formats, especially in PON, is statistical multiplexing and low latency between users (receivers) having different SNR conditions, and the resulting overall throughput improvement from such multiplexing (as opposed to worst-case throughput irrespective of SNR conditions, as employed in current and previous PON generations). However, this mixed modulation TDM generally is only efficient if no preambles are used and all users remain continuously in-sync with the received data signal. On the other hand, high order PAM is unintelligible by receivers in low SNR condition and, thus, continuous clock recovery on some receivers may be impossible in the general case, thereby necessitating use of preambles. This, in turn, negates the advantage of mixed modulation TDM due to increased overhead (since the downstream channel effectively requires burst-like clock recovery to receive TDM frames relevant and intelligible for that receiver or group of receivers).

Clock recovery in coherent detection also may be challenging in certain situations. In case of coherent detection, oversampling may be employed to account for the non-baseband nature of the data signal. After mixing the data signal with the local oscillator, resulting mixing terms have non-zero frequency offset, thereby preventing symbol-rate sampling. Additionally, the timing phase recovery process cannot be easily done at symbol rate due to the long delay of the timing feedback loop when advanced equalization, such as frequency domain chromatic dispersion compensation and polarization demultiplexing, is used. This makes clock recovery challenging in the case of coherent detection systems.

Polarization multiplexing is employed in many optical systems to increase data throughput. An optical channel, such as optical fiber or free space, can support two orthogonal polarization states, thus allowing for doubling of the data rate within the same optical spectrum when dual-polarization transmission is performed on the same wavelength. Accordingly, the number of transmitters and receivers needs to be doubled. On the transmitter side, in order to support dual polarization transmission, typically two fundamental transmitter blocks are operated in parallel, synchronously modulating two independent data streams which are combined on orthogonal polarizations. On the receiver side, as discussed further below, the processing that is performed depends on the system type (e.g., coherent detection versus direction detection). For example, in a coherent detection system, since both optical field amplitude and phase are recovered by a coherent receiver, received signals can be demultiplexed using receiver-side digital signal processing in multiple input multiple output (MIMO) equalizer (e.g., a 2×2 MIMO (butterfly) filter). However, the MIMO equalizer generally consumes considerable power in the DSP. Current research aims at reducing power consumption of transceiver subsystems, and analog polarization demultiplexing can lead to reduction of DSP power consumption and avoid DSP signal processing latency related to MIMO filtering. Additionally, employing optical polarization trackers can simplify the MIMO equalizer to single polarization equalizers when using coherent detection and enables the use of polarization demultiplexing in IM-DD systems. Furthermore, it is noted that on-chip analog polarization tracking and demultiplexing has been demonstrated and is considered as a building block of simplified coherent receivers fitting into pluggable form factor. For example, in direct detection system, since only the instantaneous power of the optical signal is detected, analog polarization demultiplexing (e.g., by an appropriate polarization control performed in front of a dual-polarization receiver) is used instead of digital polarization demultiplexing.

Polarization multiplexing, as indicated above, may provide various benefits in optical communication systems, but also has certain drawbacks. In order to employ such analog polarization demultiplexing, polarization state, which undergoes changes in the transmission channel, needs to be tracked and de-rotated appropriately on the receiver side, such that both transmitted signals can be successfully decomposed into respective signals without crosstalk on the receiver side. One approach is to add in-band frequency tone(s) at the transmitter side to transmitted signals and monitoring of tones(s) or their harmonics on the receiver side such that tone(s) or their harmonics are maximized on one of the branches after the polarization demultiplexer, it ensures that the crosstalk between polarization-multiplexed channels is minimized and both channels are demultiplexed and directed to their separate receivers. Self-homodyne detection along with synchronized transmitter and receiver clocks can enable symbol rate sampling since the signal has zero frequency offset. Symbol rate sampling lowers the cost and energy consumption of the coherent receiver as well as allows for reduced component bandwidth, especially when optical sources are not accurately wavelength-controlled (e.g., when using DFB lasers).

Coherent reception may be based on a coherent receiver that employs a local oscillator (reference oscillator) which is mixed with the incoming optical signal in different phases using a 90° optical hybrid, resulting in mixing terms at photoreceiver(s) output(s). There exist different flavors of coherent receivers, with the most common (e.g., deployed for point-to-point datacenter interconnects, metro-haul systems, and long-haul systems) being a dual-polarization coherent receiver yielding four electrical signals digitized by quantizers. The power consumption and the cost of coherent systems generally are much higher compared to the intensity modulation and direct detection systems with lower capacity (same symbol rate). It has been shown that almost 50% of the power in a 400G ZR coherent transceiver is consumed by the application specific integrated circuit (ASIC), in which more than 75% is by the digital-to-analog converter (DAC)/ analog-to-digital converter (ADC) (transmitter and receiver quantizers) and the digital signal processing (DSP).

Coherent reception may provide various benefits in optical communication systems. Various techniques have been used to simplify the coherent receiver to reduce cost and energy consumption. One widely studied technique is to use self-homodyne detection. The signal and a copy of the unmodulated signal carrier are co-propagated in parallel with data signal in the same optical channel using orthogonal polarization, or in another channel, such as a parallel optical fiber or a parallel fiber core of a multicore optical fiber. The transmitted unmodulated carrier is used, directly or after injection locking, as the LO, thereby removing the need for the frequency offset compensation and phase recovery in the DSP as well as making the system more tolerant to the laser phase noise. However, there is considerable loss of spectral efficiency as each signal needs a dedicated LO.

Various embodiments are configured to provide optical communication systems supporting clock recovery, polarization tracking, and coherent detection in a manner that overcomes various problems typically associated with supporting clock recovery, polarization tracking, and coherent detection. Various example embodiments may be configured to support clock recovery, polarization tracking, and coherent detection based on use of a set of two or more pilot optical frequency lines sent from the transmitter to the receiver, where the set of two or more pilot optical frequency lines support clock recovery at the receiver (thereby providing locking of the transmitter and receiver clocks), simple and efficient tracking of polarization state entering the receiver, and simplified (e.g., DSP-reduced or DSP-free) coherent detection. The set of two or more pilot optical frequency lines provided by the transmitter, which carry clock information in their optical frequency spacing, are unmodulated and co-propagated alongside other data signals in a communication channel to the receiver. The proposed receiver extracts a reference clock from the spacing of these unmodulated and co-propagated pilot optical frequency lines, and the extracted reference clock can be then used for sampling (replacing a clock usually recovered from the modulated signal using clock recovery circuitry, whose quality heavily depends on the data signal quality). The simple and efficient tracking of the polarization state entering the receiver obviates the need for power-hungry DSP-based polarization demultiplexing in coherent receivers and further enables analog polarization demultiplexing with direct detection receivers (for which there is currently no DSP alternative).

Various example embodiments may be provided within the context of non-homodyne operation of an optical communication system. In non-homodyne operation, carriers of data signals are optically independent of the set of two or more pilot optical frequency lines and, thus, have no exact optical frequency and phase relationship to the data signals being transmitted/received; however the frequency relationship between clock derived from the pilot optical frequency lines and modulation carried by data signals is still maintained to a high degree because of their co-propagation. This is a case that may be employed for intensity modulation and direct detection with symbol rate sampling, especially for signals employing modulation types with weak or non-existent clock tones (by design, such as duobinary), highly distorted and/or low-pass filtered signals (e.g., by chromatic dispersion and/or component bandwidth limitation), and TDM modulation using different modulation formats, for which continuous clock recovery from data signal may be challenging, especially at boundaries between modulation formats (such as mixed non-return-to-zero (NRZ)/PAM-4 Levels (PAM4) modulation), or quality of received signal is variable or insufficient (such as mixed NRZ/PAM4 modulation when SNR is sufficient for clock recovery of NRZ but not PAM4 modulation in a time-division multiplexed frame). It is noted that, use of the pilot optical frequency lines for polarization monitoring and control (tracking) at the receiver further enables single-polarization or dual-polarization direct detection receivers using modulation formats lacking clock tones and/or overhead-free and jitter-free detection for mixed/hybrid modulation TDM frames. It is noted that this non-homodyne case also applies to heterodyne or intradyne coherent detection, however due to nonzero optical frequency offset between local oscillators and carriers of data signals, sampling rate at the receiver may need to be higher than one sample per symbol to properly represent the waveform of the optical signal during sampling, though the sampling clock can be derived from the clock extracted from the pilot optical frequency lines after appropriate conversion (e.g., multiplication or division) by a predetermined rational number.

Various example embodiments may be provided within the context of homodyne operation of an optical communication system. In homodyne operation, carriers of data signals are derived from the same source as the pilot optical frequency lines at the transmitter, while local oscillators are derived at the receiver from the pilot optical frequency lines. This enables homodyne coherent reception, i.e., reception with zero optical frequency offset between the local oscillators and the carriers of the data signals. Since, in this case, after conversion of the optical signal to the electrical domain, information carried in the referenced data signal (i.e., data signal mixed with a reference oscillator) is exactly centered at baseband with an information spectral support equal to half of the symbol rate, information can be recovered from data signal when sampling at symbol rate, when employing a clock extracted from pilot optical frequency lines to control quantizer sampling instants. It is noted that further use of analog polarization demultiplexing enables simplified (e.g., DSP-light or even DSP-free) coherent reception with symbol rate sampling. It is noted that further combinations of modulation formats and mixed/hybrid modulation also are possible for the homodyne detection case.

Various example embodiments may be configured to overcome various problems associated with clock recovery, polarization tracking, and coherent reception. Various example embodiments may be configured to provide solutions to various clock recovery issues by sending, from a transmitter to a receiver, an explicit clock (in the form of a set of two or more pilot optical frequency lines), thereby allowing the receiver to continuously receive a high-quality clock irrespective of data signals and, further, allowing the receiver to sample any and all types of data signals (including signals with suppressed clock tones or highly distorted data signals), allowing the receiver to avoid clock recovery from the data signal itself, making the receiver clock independent of the quality of the received signal by minimizing receiver clock jitter. Various example embodiments may be configured to use the set of two or more pilot optical frequency lines to enable self-homodyne coherent detection with symbol rate sampling, which is DSP free or includes only simplified DSP (i.e., low-power DSP with removed functionalities, such as clock recovery and/or polarization demultiplexing), where, unlike in many proposed implementation of self-homodyne detection, only a constant spectral overhead of two pilot optical frequency lines is required for multiple data signals (although it will be appreciated that more than two pilot optical frequency lines may be used), thereby decreasing the spectral overhead and making the proposed solution interesting for spectrally-limited systems, such as WDM coherent PON. Various example embodiments may be configured to support coherent detection in a manner that enables the use of lower bandwidth photoreceivers, lower sampling rate quantizers, and less complex DSP or even no DSP for the coherent receiver, thereby lowering the cost and energy consumption of the coherent receiver.

It will be appreciated that these as well as various other example embodiments, as well as advantages or potential advantages of such example embodiments, may be further understood by considering the optical communication system of FIG. 1.

FIG. 1 depicts an example embodiment of an optical communication system, including a transmitter and a receiver, which is configured to support clock recovery and polarization tracking based on a set of pilot optical frequency lines provided from the transmitter to the receiver.

The optical communication system 100 includes a transmitter 110, a receiver 120, and a communication channel 130. The transmitter 110 transmits data 101 to the receiver 120 via the communication channel 130. The receiver 120 receives the data 101 from the transmitter 110 via the communication channel 130. It will be appreciated that the optical communication system 100 may be used for various types of optical communication channels which may be used as the communication channel 130, such as point-to-point fiber links, point to multi-point (P2MP) fiber links, free-space optical channels, and so forth.

The transmitter 110 is configured to transmit the data 101 to the receiver 120 via the communication channel 130. The transmitter 110 includes a signal generation subsystem 111, a set of transmitter subsystems 115-1 to 115-N (collectively, transmitter subsystems 115), and a multiplexer 118. It will be appreciated that the transmitter 110 may include various other elements.

The signal generation subsystem 111 outputs two pilot optical frequency lines 112-C1 and 112-C2 (collectively, pilot optical frequency lines 112, which also may be referred to more simply using the designators C1 and C2) and a transmitter clock 113. The two pilot optical frequency lines 112 are provided to the multiplexer 118 for transmission downstream toward the receiver 120. The transmitter clock 113 is provided to each of the N synchronized transmitter subsystems 115. The signal generation subsystem 111 optionally may generate a set of optical carrier signals 114-1 to 114-N (collectively, optical carrier signals 114, which also may be referred to as optical carrier frequencies $f_1$-$f_N$ and referenced more generally as optical carrier frequencies $f_k$), which may be modulated by the data 101 for transmission of the data 101 toward the receiver 120. It is noted that, with N transmitter subsystems 115, N optical carrier signals 114 may be generated if each of the N transmitter subsystems 115 uses coherent homodyne detection (i.e., a 1:1 mapping between the optical carrier signals 114 and the transmitter subsystems 115), whereas fewer optical carrier signals 114 (e.g., between 0 and N−1) may be generated and used where any of the N transmitter subsystems 115 supports other than coherent homodyne detection (e.g., direct modulation, coherent intradyne detection, coherent heterodyne, or the like, as well as various combinations thereof). It is noted that the two pilot optical frequency lines 112 and the optical carrier signals 114 may be referred to more generally as optical frequency lines or equally-spaced correlated optical frequency lines (where such equally-spaced correlated optical frequency lines may be based on an optical frequency comb (OFC) generated at the transmitter 110 or may be based on one or more other suitable sources of equally-spaced correlated optical frequency lines at the transmitter 110). It will be appreciated that, although primarily presented with respect to use of a particular set of optical frequency lines as the pilot optical frequency lines (namely, use of two adjacent optical frequency lines, as illustrated with respect to the two pilot optical frequency lines 112), various other combinations of optical frequency lines may be used as the pilot optical frequency lines (e.g., using more than two lines, using adjacent optical frequency lines, using non-adjacent optical frequency lines, or the like, as well as various combinations thereof). It is noted that, in at least some example embodiments, the signal generation subsystem 111 may be implemented as presented with respect to FIG. 2, FIG. 3, or FIG. 4.

The transmitter subsystems 115 receive the data 101 and generate downstream data signals 117-1 to 117-N (collectively, downstream data signals 117) which are provided to the multiplexer 118 for transmission downstream toward the receiver 120. The transmitter subsystems 115, when the signal generation subsystem 111 generates the optical carrier signals 114, may modulate the optical carrier signals 114 by the data 101 to generate the downstream data signals 117. It is noted that the downstream data signals 117 may be single-polarization signals or dual-polarization signals (having associated polarization states that may need to be aligned, as discussed further below). It is noted that, in at least some example embodiments, the transmitter subsystem 115 may be implemented as presented with respect to FIGS. 5A-5D.

The multiplexer 118 multiplexes the pilot optical frequency lines 112 and the downstream data signals 117 to form a multiplexed downstream signal 131 that is propagated to the receiver 120 via the communication channel 130. It is noted that the multiplexing of the downstream data signals 117 may be performed in a manner such that the polarization states of the downstream data signals 117 are aligned to each other.

It is noted that the presence of the optical carrier signals 114 may depend on whether or not homodyne operation is performed at the receiver 120 (in general, use of such optical carrier signals 114 may be beneficial if coherent detection is performed on the receiver side, as it allows a reduction of the required receiver bandwidth and enables symbol rate sampling with minimum penalty but is not required for a generic coherent intradyne detection with oversampling, or for direct detection).

The receiver 120 is configured to receiver the data 101 from the transmitter 110 via the communication channel 130. The receiver 120 includes a polarization controller 121, an optical splitter 123, a set of receiver subsystems 125-1 to 125-k (collectively, receiver subsystems 125), and a clock synchronization and polarization tracking subsystem 126. It will be appreciated that the receiver 120 may include various other elements.

The polarization controller 121 receives the multiplexed downstream signal 131' from the transmitter 110 via the communication channel 130. The polarization controller 121 aligns the polarization state at the receiver input based on a polarization control feedback signal 127 from the clock synchronization and polarization tracking subsystem 126. The polarization controller 121 provides the received signal 122, which includes the pilot optical frequency lines 112' and the downstream data signals 117', to the optical splitter 123. The optical splitter 123 is a (k+1) optical splitter that splits the received signal 122 into k+1 branches, which are provided to the k receiver subsystems 125 and the clock synchronization and polarization tracking subsystem 126, respectively.

The receiver subsystems 125 are configured to receive the received signal 122 and recover the data 101 from the received signal 122 based on clock synchronization and polarization tracking functions performed by the clock synchronization and polarization tracking subsystem 126. The receiver subsystems 125 are configured to receive a receiver clock 128 from the clock synchronization and polarization tracking subsystem 126 and use the receiver clock 128 to recover the data 101 from the received signal 122. The receiver subsystems 125, in the case of homodyne detection, also may receive a set of local oscillator signals 129-1 to 129-P (collectively, local oscillator signals 129, which also may be referred to as optical frequencies $f'_1$-$f'_p$ and referenced more generally as optical frequencies $f'_k$, where P may or may not be equal to N, which are analogous to the optical carrier signals 114-1 to 114-N (optical carrier frequencies $f_k$) at the transmitter 110), which may be used as external local oscillator inputs for the receiver subsystems 125, respectively. It is noted that, as discussed further herein, the local oscillator signals 129 may be obtained from a regenerated OFC which may be regenerated at the receiver 120 (e.g., based on pilot optical frequency lines 112' received from the transmitter 110). It is noted that, in at least some example embodiments, a receiver subsystem 125 may be implemented as presented with respect to FIGS. 6A-6D.

The clock synchronization and polarization tracking subsystem 126 is configured to receive the received signal 122 and generate the polarization control feedback signal 127, the receiver clock 128, and, optionally, the local oscillator signals 129. The clock synchronization and polarization tracking subsystem 126 is configured to generate the polarization control feedback signal 127 and the receiver clock 128, as well as the local oscillator signals 129 when used, based on the pilot optical frequency lines 112' which are included in the received signal 122. It is noted that the two pilot optical frequency lines 112' and the local oscillator signals 129 may be referred to more generally as optical frequency lines or equally-spaced correlated optical frequency lines (where such equally-spaced correlated optical frequency lines may be based on regeneration of an OFC at the receiver 120 based on two pilot optical frequency lines 112' or may be based on one or more other suitable sources of equally-spaced correlated optical frequency lines at the receiver 120). The clock synchronization and polarization tracking subsystem 126 provides the polarization control feedback signal 127 to the polarization controller 121 for use by the polarization controller 121 in aligning the polarization state. The clock synchronization and polarization tracking subsystem 126 provides the receiver clock 128 to each of the receiver subsystems 129 for use by the receiver subsystems 129 to synchronize the receiver clock and processing with the transmitter clock 113 used at the transmitter 110. In this manner, clock synchronization and polarization tracking is achieved based on the two pilot optical frequency lines 112' provided from the transmitter 110 to the receiver 120. It is noted that, in at least some example embodiments, clock synchronization and polarization tracking subsystem 126 may be implemented as presented with respect to FIG. 7 or FIG. 8.

It will be appreciated that, in this manner, use of the pair of pilot optical frequency lines (C1 and C2) enables clock synchronization (between the transmitter clock 113 and the receiver clock 128) and polarization tracking and, further, locking of the optical carrier signals 114 and the local oscillator signals 129) further enables homodyne coherent detection (with minimal or no DSP) with symbol rate sampling.

It will be appreciated that, based on use of the pair of pilot optical frequency lines (C1 and C2) for clock synchronization, polarization tracking, and homodyne coherent detection, the required photoreceiver bandwidth can be lowered due to absence of frequency offset and symbol rate sampling can be enabled allowing for DSP-free coherent reception (e.g., while some DSP steps may be necessary depending on the wavelength/fiber distance/modulation format, in principle a simple modulation format such as quadrature phase shift keying (QPSK) over a typical PON distance of 20 km could be received DSP-free).

It will be appreciated that, although primarily presented with respect to use of two optical frequency lines in the set of pilot optical frequency lines that is used for clock synchronization, polarization tracking, and homodyne coherent detection (namely, the two pilot optical frequency lines 112 as presented herein), in at least some example embodiments the set of pilot optical frequency lines that is used for clock synchronization, polarization tracking, and homodyne coherent detection may include more than two optical frequency lines.

It will be appreciated that, although primarily presented with respect to use of wavelength-tunable receiver subsystems based on use of optical splitters and tunable local oscillators, various example embodiments may be configured to use wavelength demultiplexers and/or splitter/filter structures (e.g., in various contexts, including for direct detection).

FIG. 2 depicts an example embodiment of a signal generation subsystem for use in the transmitter of the optical communication system of FIG. 1. As illustrated in FIG. 2, the signal generation subsystem 200 may be used as the signal generation subsystem 111 of FIG. 1 (with FIG. 2 illustrating configuration of the signal generation subsystem 200 to output the two pilot optical frequency lines 112 (C1 and C2), the transmitter clock 113, and, optionally, the optical carrier signals 114 (denoted using optical carrier frequencies $f_1$-$f_N$)).

In the signal generation subsystem 200, the transmitter clock 113 and the spacing of the optical frequency lines (which are used for the two pilot optical frequency lines 112 and optionally, the optical carrier signals 114) are both derived from a reference clock (e.g., a system clock, a clock derived from a system clock, or the like). As illustrated in FIG. 2, the signal generation subsystem 200 may include a reference clock 210, an optical frequency line subsystem 220, and a demultiplexer 230.

The signal generation subsystem 200 may generate the transmitter clock 113, the pilot optical frequency lines 112, and the optical carrier signals 114 based on the reference clock 210. For the pilot optical frequency lines 112 and the optical carrier signals 114, the reference clock 210 is converted by a clock converter 211 based on a conversion factor (indicated by a, where a is a rational number, which may indicate multiplication or division in accordance with the conversion factor)) to provide a converted clock to drive the optical frequency line subsystem 220 which generates the pilot optical frequency lines 112 and the optical carrier signals 114. For the transmitter clock 113, the reference clock 210 is converted by a clock converter 212 based on a conversion factor (indicated by β, where β is a rational number, which may indicate multiplication or division in accordance with the conversion factor) to produce the transmitter clock 113.

The signal generation subsystem 200 may generate a set of optical frequency lines which may be used as the pilot optical frequency lines 112 and, optionally, the optical carrier signals 114. The optical frequency lines subsystem 220 may generate the set of optical frequency lines which may be used as the pilot optical frequency lines 112 and, optionally, the optical carrier signals 114. The optical frequency lines can originate from an OFC, from a modulator configured to generate two or more optical frequency lines, or the like. The optical frequency lines may be generated such that the spacing between the optical frequency lines is in a fixed, predetermined relationship to the reference clock 210 driving the optical frequency line subsystem 220.

The signal generation subsystem 200 may generate the pilot optical frequency lines 112 with or without generating the optical carrier signals 114. If the optical frequency lines subsystem 220 generates only two optical frequency lines, then these optical frequency lines are used as the pilot optical frequency lines 112 (i.e., as C1 and C2). If the optical frequency lines subsystem 220 generates more than two optical frequency lines, then any two of these optical frequency lines may be used as the pilot optical frequency lines 112 (i.e., as C1 and C2). For example, the two optical frequency lines that are used may be two adjacent frequency lines or two non-adjacent frequency lines, although it will be appreciated that use of two adjacent frequency lines may be beneficial in certain implementations.

The signal generation subsystem 200 utilizes the demultiplexer 230 to separate the optical frequency lines output by the optical frequency lines subsystem 220. In the case of homodyne operation, the demultiplexer 230 is used to separate the pilot optical frequency lines 112 and the optical carrier signals 114, so as to provide the pilot optical frequency lines 112 for transmission downstream (i.e., as C1 and C2) and to provide the optical carrier signals 114 to the transmitter subsystems (e.g., transmitter subsystems 115, which are omitted for purposes of clarity), respectively. In the case of non-homodyne operation, the demultiplexer 230 is used to separate the optical frequency lines 112 to provide the pilot optical frequency lines 112 for transmission downstream (i.e., as C1 and C2). The demultiplexer 230 may be implemented in various ways (e.g., using an arrayed waveguide grating (AWG), using splitters followed by an array of optical filters or an array of optically injection-locked (OIL) sources, or the like, as well as various combinations thereof.

It will be appreciated that the signal generation subsystem 200 may be implemented in other ways for producing the transmitter clock 113, the pilot optical frequency lines 112, and the optical carrier signals 114.

Figure 3:
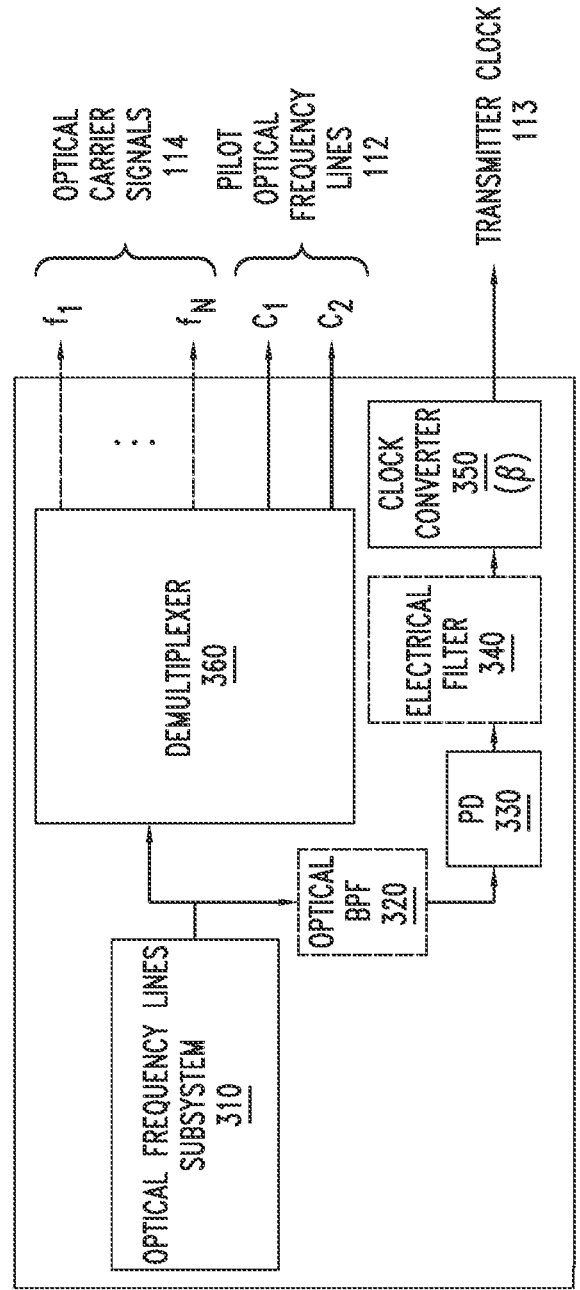
FIG. 3 depicts an example embodiment of a signal generation subsystem for use in the transmitter of the optical communication system of FIG. 1.

FIG. 3 depicts an example embodiment of a signal generation subsystem for use in the transmitter of the optical communication system of FIG. 1. As illustrated in FIG. 3, the signal generation subsystem 300 may be used as the signal generation subsystem 111 of FIG. 1 (with FIG. 3 illustrating configuration of the signal generation subsystem 300 to output the two pilot optical frequency lines 112 (C1 and C2), the transmitter clock 113, and, optionally, the optical carrier signals 114 (denoted using optical carrier frequencies $f_1$-$f_N$)).

In the signal generation subsystem 300, the transmitter clock 113 is derived from the spacing of the optical frequency lines (which are used for the two pilot optical frequency lines 112 and optionally, the optical carrier signals 114) before demultiplexing of the optical frequency lines. As illustrated in FIG. 3, the signal generation subsystem 300 may include an optical frequency lines subsystem 310, an optical bandpass filter (BPF) 320, a photodetector (PD) 330, an electrical filter 340 (indicated as being optional), a clock converter 350, and a demultiplexer 360.

The signal generation subsystem 300 may generate the transmitter clock 113, the pilot optical frequency lines 112, and the optical carrier signals 114 based on a set of optical frequency lines generated by the optical frequency lines subsystem 310. The set of optical frequency lines generated by the optical frequency line subsystem 310 (or a portion thereof) may be used to generate the transmitter clock 113 (e.g., using two or more of the optical frequency lines via the path that includes the PD 330). The set of optical frequency lines generated by the optical frequency lines subsystem 310 (or a portion thereof) may be used as the pilot optical frequency lines 112 and, optionally, the optical carrier signals 114. The optical frequency line can originate from an OFC, from a gain switched comb source, from a quantum-dash mode-locked lasers, from a microresonator-based Kerr frequency comb, from a modulator configured to generate two or more optical frequency lines, or the like.

The signal generation subsystem 300 may generate the transmitter clock 113 based on the full set of optical frequency lines generated by the optical frequency line subsystem 310. In this case, the optical BPF 320 is not present so that the full set of optical frequency lines generated by the optical frequency line subsystem 310 is provided to the PD 320 for use in generating the transmitter clock 113.

The signal generation subsystem 300 may generate the transmitter clock 113 based on a selected number of optical frequency lines selected from the full set of optical frequency lines generated by the optical frequency line subsystem 310 (which may include two or more of the optical frequency lines up to the full set of optical frequency lines). In this case, the optical BPF 320 is present and controls the quantity of the optical frequency lines generated by the optical frequency line subsystem 310 provided to the PD 330 for use in generating the transmitter clock 113.

The signal generation subsystem 300 may derive the transmitter clock 113 by beating two or more of the optical frequency lines on PD 330, optionally applying filtering using the electrical filter 340 which performs electrical bandpass or low pass filtering, and performing clock conversion by the clock converter 350 based on a conversion factor (indicated by $\chi$, where $\chi$ is a fixed rational number, which may indicate multiplication or division in accordance with the conversion factor) to produce the transmitter clock 113.

The signal generation subsystem 300 may generate the pilot optical frequency lines 112 with or without generating the optical carrier signals 114. If the optical frequency lines subsystem 310 generates only two optical frequency lines, then these optical frequency lines are used as the pilot optical frequency lines 112 (i.e., as C1 and C2). If the optical frequency lines subsystem 310 generates more than two optical frequency lines, then any two of these optical frequency lines may be used as the pilot optical frequency lines 112 (i.e., as C1 and C2). For example, the two optical frequency lines that are used may be two adjacent frequency lines or two non-adjacent frequency lines, although it will be appreciated that use of two adjacent frequency lines may be beneficial in certain implementations.

The signal generation subsystem 300 utilizes the demultiplexer 360 to separate the optical frequency lines output by the optical frequency lines subsystem 310. In the case of homodyne operation, the demultiplexer 360 is used to separate the pilot optical frequency lines 112 and the optical carrier signals 114, so as to provide the pilot optical frequency lines 112 for transmission downstream (i.e., as C1 and C2) and to provide the optical carrier signals 114 to the transmitter subsystems (e.g., transmitter subsystems 115, which are omitted for purposes of clarity), respectively. In the case of non-homodyne operation, the demultiplexer 360 is used to separate the optical frequency lines 112 to provide the pilot optical frequency lines 112 for transmission downstream (i.e., as C1 and C2). The demultiplexer 360 may be implemented in various ways (e.g., using an AWG, using splitters followed by an array of optical filters or an array of OIL sources, or the like, as well as various combinations thereof.

It will be appreciated that the signal generation subsystem 300 may be implemented in other ways for producing the transmitter clock 113, the pilot optical frequency lines 112, and the optical carrier signals 114.

Figure 4:
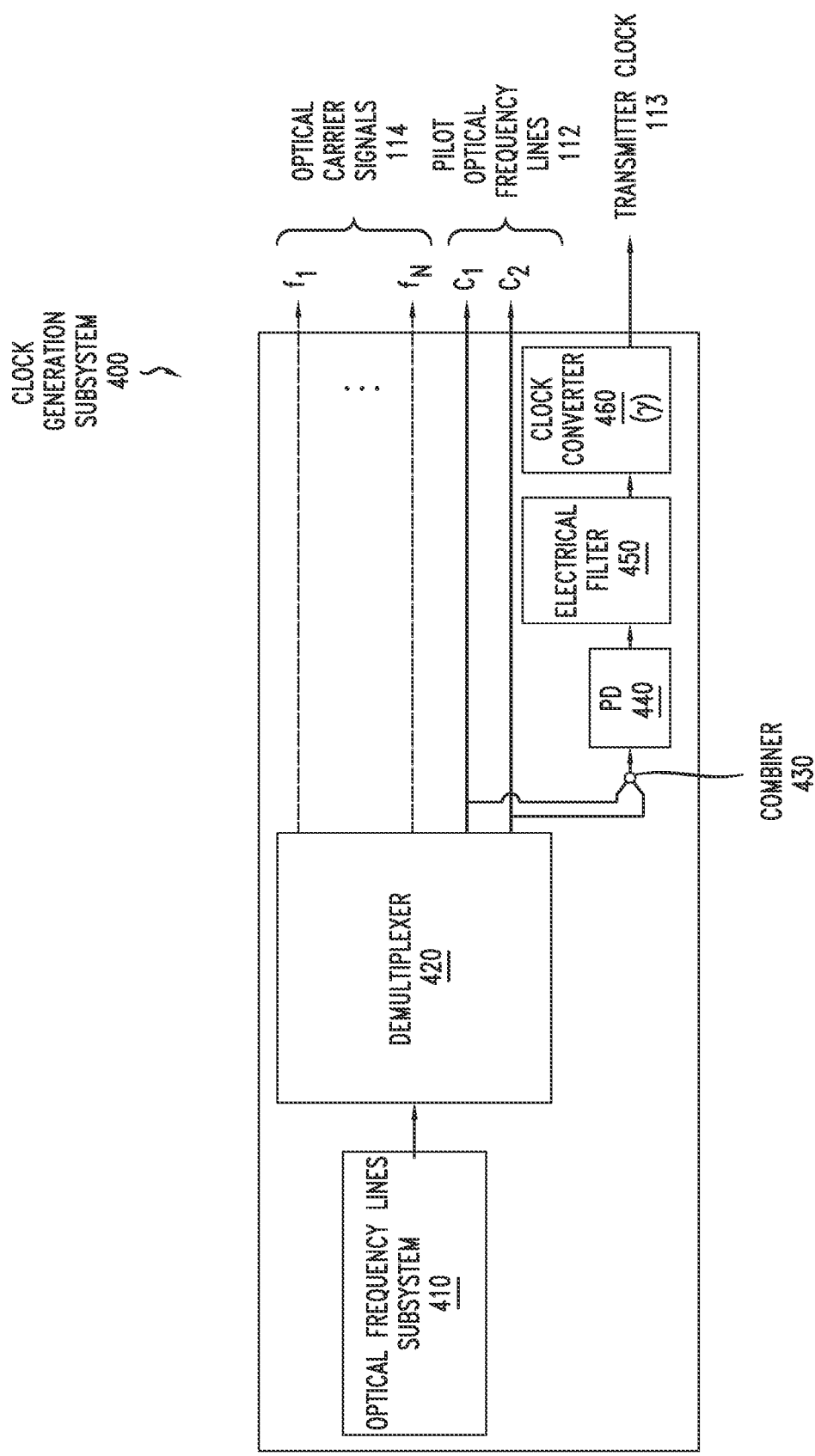
FIG. 4 depicts an example embodiment of a signal generation subsystem for use in the transmitter of the optical communication system of FIG. 1.
Figure 5B:
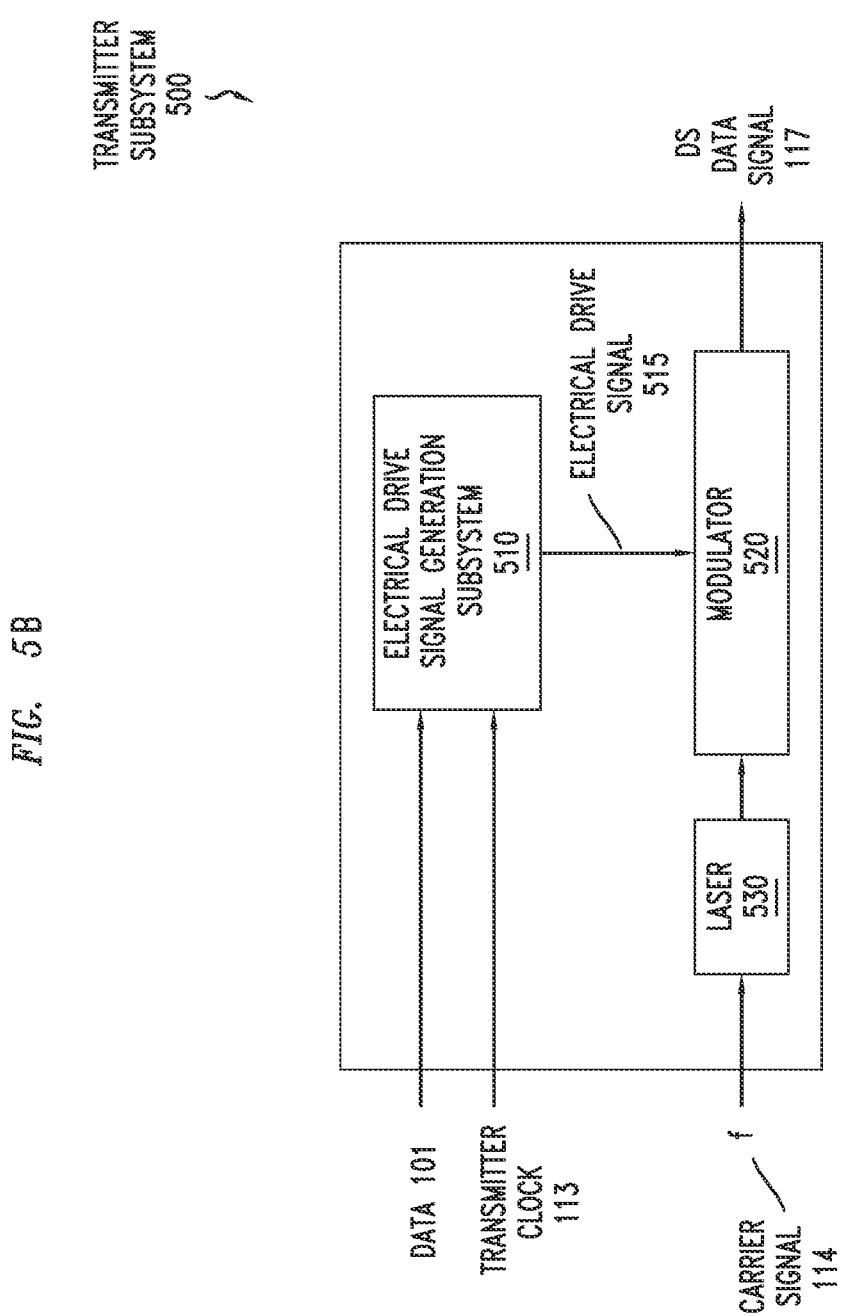
Figure 5C:
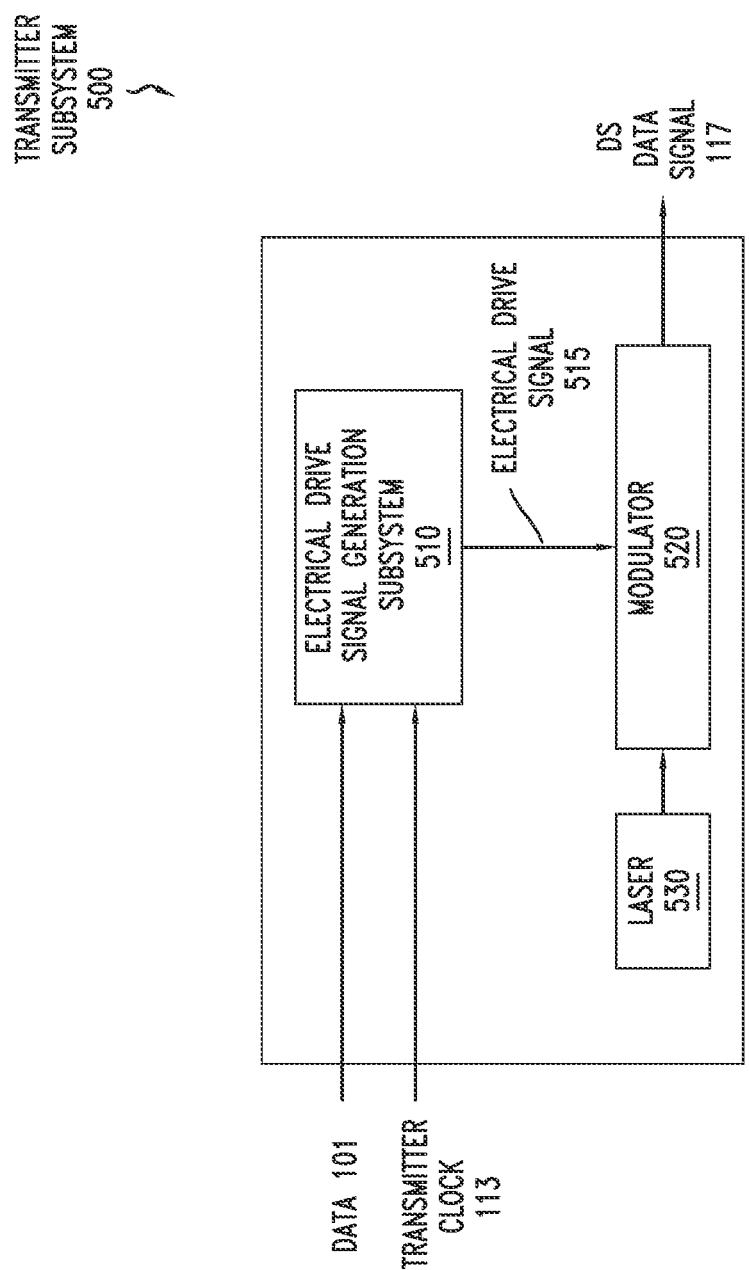
Figure 5D:
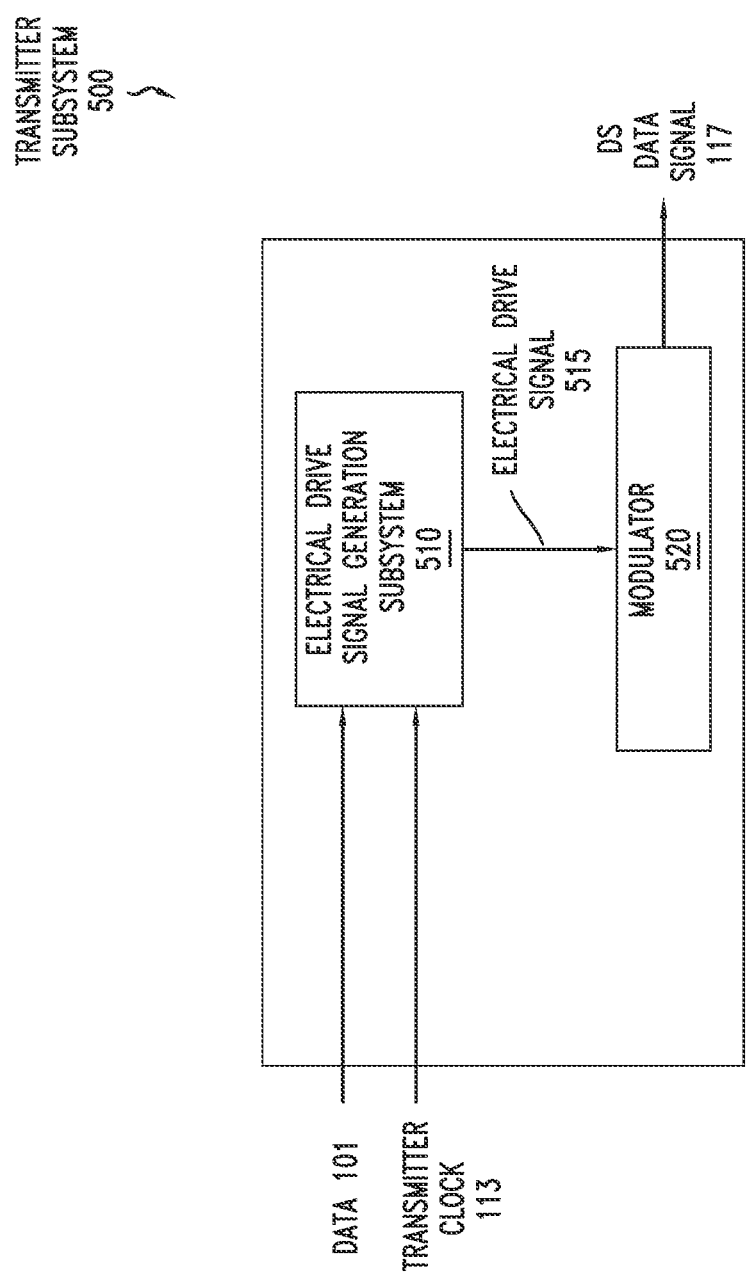
Figure 6B:
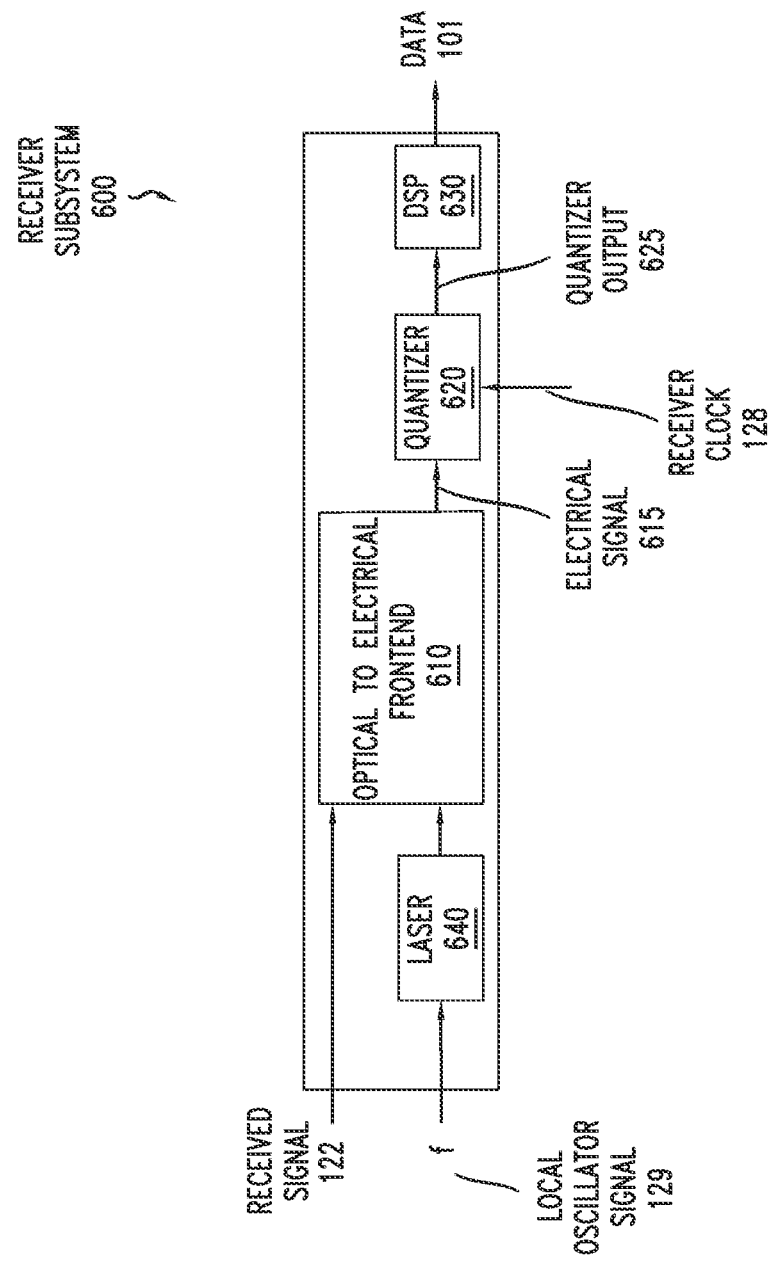
Figure 6C:
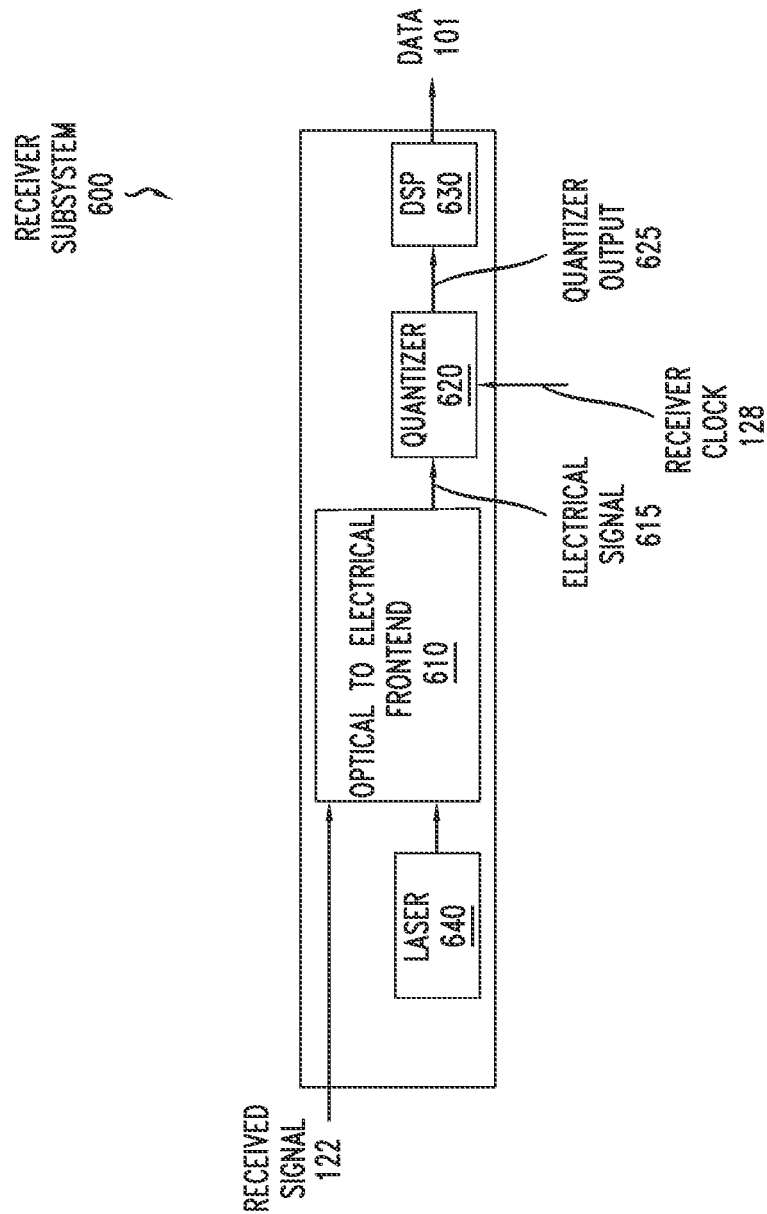

FIG. 4 depicts an example embodiment of a signal generation subsystem for use in the transmitter of the optical communication system of FIG. 1. As illustrated in FIG. 4, the signal generation subsystem 400 may be used as the signal generation subsystem 111 of FIG. 1 (with FIG. 4 illustrating configuration of the signal generation subsystem 400 to output the two pilot optical frequency lines 112 (C1 and C2), the transmitter clock 113, and, optionally, the optical carrier signals 114 (denoted using optical carrier frequencies $f_1$-$f_N$)).

In the signal generation subsystem 400, the transmitter clock 113 is derived from the spacing of at least two of the optical frequency lines (which are used for the two pilot optical frequency lines 112 and optionally, the optical carrier signals 114) after demultiplexing of the optical frequency lines. As illustrated in FIG. 4, the signal generation subsystem 400 may include an optical frequency lines subsystem 410, a demultiplexer 420, a combiner 430, a photodetector (PD) 440, and an electrical filter 450.

The signal generation subsystem 400 may generate the transmitter clock 113, the pilot optical frequency lines 112, and the optical carrier signals 114 based on a set of optical frequency lines generated by the optical frequency lines subsystem 410. The set of optical frequency lines generated by the optical frequency line subsystem 410 (or a portion thereof) may be used as the pilot optical frequency lines 112 and, optionally, the optical carrier signals 114. The optical frequency lines generated by the optical frequency lines subsystem 410 that are used as the pilot optical frequency lines 112 may be used to generate the transmitter clock 113 (via the path that includes the combiner 430, the PD 440 and the electrical filter 450). The optical frequency lines can originate from an OFC, from a microresonator-based Kerr frequency comb, from a modulator configured to generate two or more optical frequency lines, or the like.

The signal generation subsystem 400 may generate the transmitter clock 113 based on a subset of the set of optical frequency lines generated by the optical frequency line subsystem 410. For example, the subset may include two adjacent optical frequency lines, two non-adjacent optical frequency lines, at least two even optical frequency lines, at least two odd optical frequency lines, at least two even or odd optical frequency lines, at least two of every n-th optical frequency line, or the like, as well as various combinations thereof. It will be appreciated that various other combinations of optical frequency lines may be used as the subset of the optical frequency lines used to generate the transmitter clock 113. It will be appreciated that this is illustrated by only a subset of the optical frequency lines output by the optical frequency line subsystem 410 (based on separation of the optical frequency lines by the demultiplexer 420) being provided to the PD 440 for use in generating the transmitter clock 113. It will be appreciated that subset of optical frequency lines used to generate the transmitter clock 113 may or may not be the same optical frequency lines that are sent to the receiver.

The signal generation subsystem 400 may derive the transmitter clock 113 by combining the two optical frequency lines 112 with the combiner 430, beating the two optical frequency lines 112 on PD 440, optionally filtering using the electrical filter 450 which performs electrical bandpass filtering, and clock conversion by a clock converter 460 based on a conversion factor (indicated by $\chi$, where $\chi$ is a fixed rational number, which may indicate multiplication or division in accordance with the conversion factor) to produce the transmitter clock 113. It will be appreciated that, although primarily presented with respect to use of bandpass filtering, in at least some example embodiments electrical low pass filtering may be applied.

The signal generation subsystem 400 may generate the pilot optical frequency lines 112 with or without generating the optical carrier signals 114. If the optical frequency lines subsystem 410 generates only two optical frequency lines, then these optical frequency lines are used as the pilot optical frequency lines 112 (i.e., as C1 and C2). If the optical frequency lines subsystem 410 generates more than two optical frequency lines, then any two of these optical frequency lines may be used as the pilot optical frequency lines 112 (i.e., as C1 and C2). For example, the two optical frequency lines that are used may be two adjacent frequency lines or two non-adjacent frequency lines, although it will be appreciated that use of two adjacent frequency lines may be beneficial in certain implementations.

It will be appreciated that the signal generation subsystem 400 may be implemented in other ways for producing the transmitter clock 113, the pilot optical frequency lines 112, and the optical carrier signals 114.

FIGS. 5A-5D depict example embodiments of a transmitter subsystem for use in the transmitter of the optical communication system of FIG. 1. As illustrated in FIGS. 5A-5D, the transmitter subsystem 500 may be used as any of the transmitter subsystems 115 of FIG. 1 (with FIGS. 5A-5D illustrating configuration of the transmitter subsystem 500 to receive the transmitter clock 113 and output the downstream data signal 117).

In the transmitter subsystem 500, the data 101 is used to generate the downstream data signals 117 for transmission of the data 101 toward the intended receiver. In the transmitter subsystem 500, in the case of homodyne operation, an external carrier into a transversal or reflective optical modulator may be used. In the non-homodyne case, a directly modulated or externally modulated laser may be used or a transversal or reflective modulator without an external carrier signal may be used. As illustrated in FIGS. 5A-5D, the transmitter subsystem 500 may include an electrical drive signal generation subsystem 510, a modulator 520, and, optionally, a laser 530. As discussed further below, the variations in FIGS. 5A-5D (including whether laser 530 is present) are related to the manner in which modulation is performed at the transmitter subsystem 500 (which, in turn, is related to the manner in which the detection is performed at the receiver 120).

The electrical drive signal generation subsystem 510 receives the data 101 and the transmitter clock 113 and creates an electrical drive signal 515 for the modulator 520, such that electrical symbols are generated at a rate which is in a predetermined rational relationship for the transmitter clock 113. The modulator 520 is configured to generate the downstream data signals 117, which are modulated signals in one or two orthogonal polarizations, which are transmitted with the two pilot optical frequency lines (C1 and C2) in the optical communication channel. For the homodyne operation case, the modulator 520 can be an optical single-polarization or dual-polarization in-phase/quadrature (IQ) modulator, an electro-absorption modulator (EAM), a ring modulator, another type of transversal or reflective optical modulator or modulators in series or in parallel, or the like. For the non-homodyne operation case, the modulator 520 can be any of the modulator types listed for the homodyne operation case; alternatively, it may employ a directly modulated laser(s), or other types of directly modulated sources configured to generate modulated signal(s) in one or in two orthogonal polarizations.

In FIGS. 5A-5D, as indicated above, the variations in the transmitter subsystem 500 are related to the manner in which the modulation is performed at the transmitter subsystem 500 (and the manner in which detection is performed at the receiver 120). In the example embodiment of FIG. 5A, which may be used where homodyne detection is used at receiver 120 (e.g., based on FIG. 6A or FIG. 6B), the optical carrier signal 114 is provided directly to the modulator 520. In the example embodiment of FIG. 5B, which may be used where homodyne detection is used at the receiver 120 (e.g., based on FIG. 6A or FIG. 6B), the transmitter subsystem 500 includes the laser 530 and the optical carrier signal 114 is provided to the laser 530 for optical injection locking of the laser 530 using the optical carrier signal 114. In the example embodiment of FIG. 5C, which may be used where non-homodyne detection is used at the receiver 120 (e.g., direct detection, heterodyne coherent detection or intradyne coherent detection), the transmitter subsystem 500 includes the laser 530 which operates as an externally modulated laser source. In the example embodiment of FIG. 5D, which may be used for direct detection, neither the optical carrier signal 114 nor the laser 530 is used, and the modulator 520, despite its name, will be understood to be a directly modulated laser source.

It will be appreciated that the transmitter subsystem 500 may be implemented in other ways for producing the downstream data signal 117 from the data 101 based on the transmitter clock 113 and, optionally, the optical carrier signal 114.

FIGS. 6A-6D depict example embodiments of a receiver subsystem for use in the receiver of the optical communication system of FIG. 1. As illustrated in FIGS. 6A-6D, the receiver subsystem 600 may be used as any of the receiver subsystems 125 of FIG. 1 (with FIGS. 6A-6D illustrating configuration of the receiver subsystem 600 to receive the received signal 122 and output the recovered data 101).

In the receiver subsystem 600, the data 101 is recovered from the received signal 122 that is received from the transmitter. As illustrated in FIGS. 6A-6D, the receiver subsystem 600 may include an. It will be appreciated that the receiver subsystem 600 may be implemented in other ways for recovering the data 101 based on the receiver clock 128 and, optionally, the local oscillator signals 129.

Figure 7:
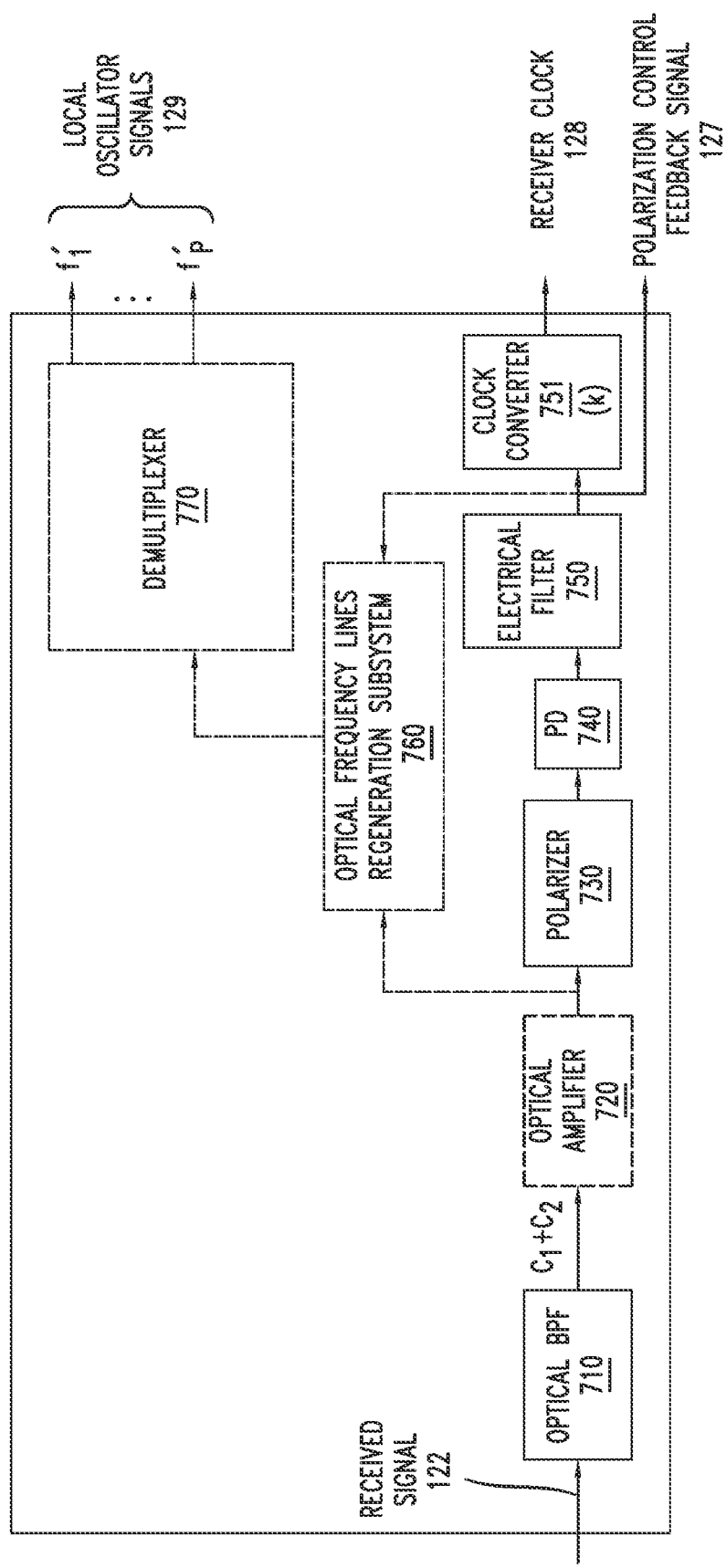
FIG. 7 depicts an example embodiment of a clock recovery and polarization tracking subsystem for use in the receiver of the optical communication system of FIG. 1.

FIG. 7 depicts an example embodiment of a clock recovery and polarization tracking subsystem for use in the receiver of the optical communication system of FIG. 1. As illustrated in FIG. 7, the clock synchronization and polarization tracking subsystem 700 may be used as the clock synchronization and polarization tracking subsystem 126 of FIG. 1 (with FIG. 7 illustrating configuration of the clock synchronization and polarization tracking subsystem 700 to receive the received signal 122 and output the polarization control feedback signal 127, the receiver clock 128, and, optionally, the local oscillator signals 129).

In the clock synchronization and polarization tracking subsystem 700, the pilot optical frequency lines 112' are filtered together for generation of the polarization control feedback signal 127, the receiver clock 128, and, optionally, the local oscillator signals 129. As illustrated in FIG. 7, the clock synchronization and polarization tracking subsystem 700 may include an optical bandpass filter (BPF) 710, an optical amplifier 720, a polarizer 730, a photodetector (PD) 740, an electrical filter 750, an optical frequency line regeneration subsystem 760, and a demultiplexer 770.

The optical BPF 710 receives the received signal 122 and filters the received signal 122 to extract the pilot optical frequency lines 112' (C1 and C2). The optical BPF 710 may provide the pilot optical frequency lines 112' directly to the polarizer 730 and the optical frequency lines regeneration subsystem 760 without amplification (in which case the optical amplifier 720 may not be present) or may provide the pilot optical frequency lines 112' to the optical amplifier 720 for amplification before the pilot optical frequency lines 112' are provided to the polarizer 730 and the optical frequency lines regeneration subsystem 760.

The optical amplifier 720 may receive the pilot optical frequency lines 112' and amplify the pilot optical frequency lines 112' to provided amplified versions of the pilot optical frequency lines 112' to the polarizer 730 and the optical frequency lines regeneration subsystem 760. It will be appreciated that, as indicated above, the optical amplifier 720 may or may not be present or used for amplifying the pilot optical frequency lines 112'.

The pilot optical frequency lines 112' are used for creation of the polarization control feedback signal 127 that is used by the polarization controller (omitted for purposes of clarity). The pilot optical frequency lines 112' are sent through the polarizer 730 and detected on the PD 740 to recover the optical frequency line spacing, and then the detected fundamental tone (or its harmonic) is band pass filtered by the electrical filter 750 and the power of the output of the electrical filter 750 is measured to create polarization control feedback signal 127 for the polarization controller. It is noted that, since polarizations are orthogonal, maximizing the power through the polarizer 730 indicates that the polarization controller is set properly to achieve polarization demultiplexing.

The pilot optical frequency lines 112' also are used for generation of the receiver clock 128. The pilot optical frequency lines 112' are sent through the polarizer 730 and detected on the PD 740 to recover the optical frequency line spacing, and then the detected fundamental tone (or its harmonic) is electrically filtered by the electrical filter 750. The filtered signal output by the electrical filter 750 is then converted by a clock converter 751 based on a conversion factor (indicated by a known ratio (K), which may indicate multiplication or division in accordance with the conversion factor) to generate the receiver clock 128 which, by the virtue of being locked to the transmitter clock 113, is also synchronized with the reference clock, thereby also locking the receiver clock 128 to the reference clock.

The pilot optical frequency lines 112', in the case of homodyne operation, also are used for generation of the local oscillator signals 129. In this case, the pilot optical frequency lines 112' are split off before the polarizer 730 and provided to the optical frequency lines regeneration subsystem 760. The regeneration of the local oscillator signals 129 from the pilot optical frequency lines 112' may be performed in various ways. For example, in at least some example embodiments, both of the pilot optical frequency lines 112' (C1 and C2) are used to regenerate the optical frequency lines (e.g., by means of a nonlinear process in an optical medium). The local oscillator signals 129 (which also may be referred to as regenerated lines $f'_1$-$f'_p$, where the value "P" may or may not be equal to the value "N" of the optical carrier signals 114 which are denoted as $f_1$-$f_N$, since there may be support for a mix of homodyne detection and non-homodyne reception (e.g., coherent heterodyne detection, coherent intradyne detection, direct detection, or the like)) are then demultiplexed by the demultiplexer 770 to act as the LO for coherent homodyne detection. It will be appreciated that clock synchronization and polarization tracking subsystem 700 may be implemented in other ways for using the received signal 122 to generate the polarization control feedback signal 127, the receiver clock 128, and, optionally, the local oscillator signals 129.

Figure 8:
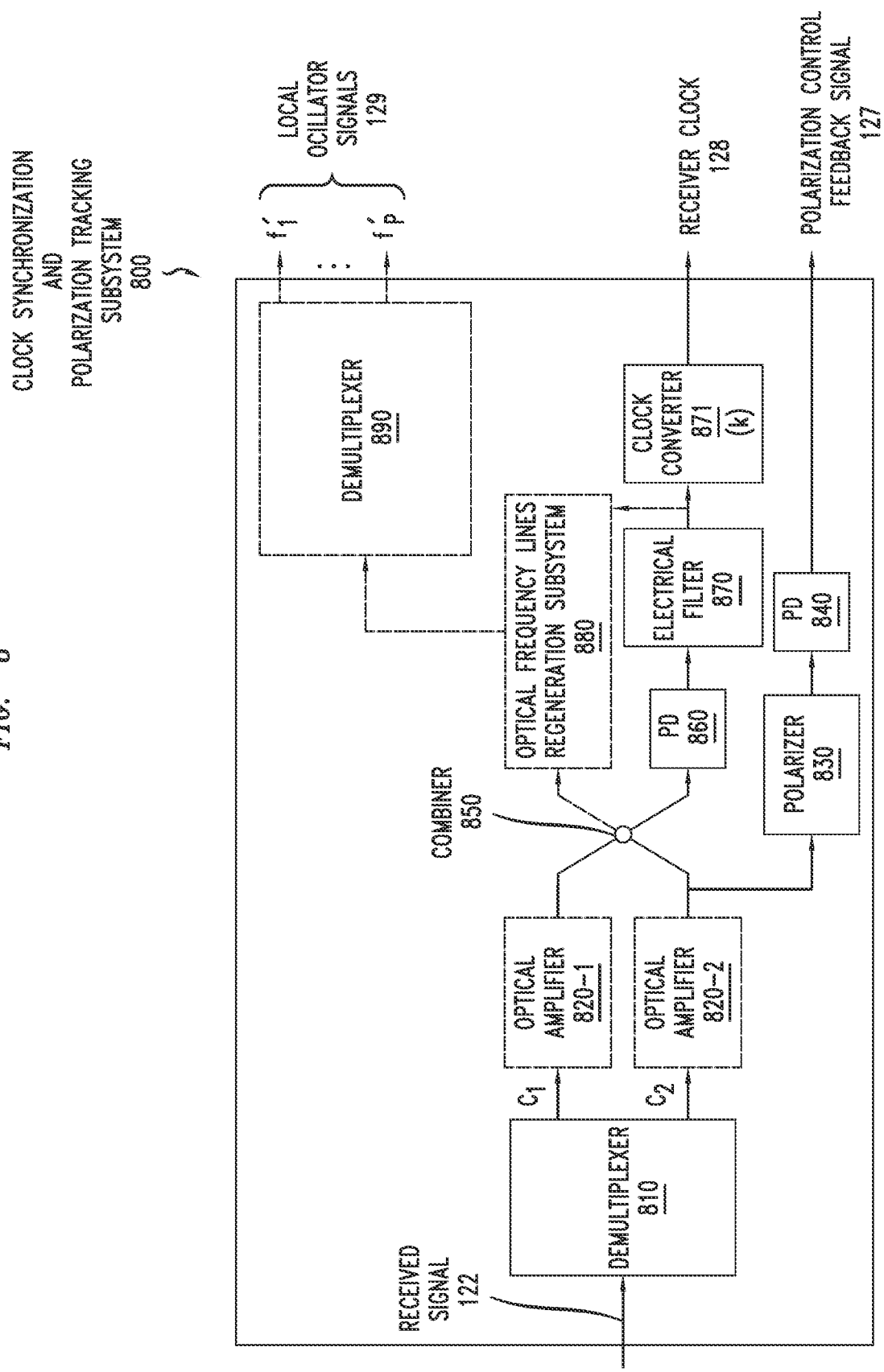
FIG. 8 depicts an example embodiment of a clock recovery and polarization tracking subsystem for use in the receiver of the optical communication system of FIG. 1.

FIG. 8 depicts an example embodiment of a clock recovery and polarization tracking subsystem for use in the receiver of the optical communication system of FIG. 1. As illustrated in FIG. 8, the clock synchronization and polarization tracking subsystem 800 may be used as the clock synchronization and polarization tracking subsystem 126 of FIG. 1 (with FIG. 8 illustrating configuration of the clock synchronization and polarization tracking subsystem 800 to receive the received signal 122 and output the polarization control feedback signal 127, the receiver clock 128, and, optionally, the local oscillator signals 129).

In the clock synchronization and polarization tracking subsystem 800, the pilot optical frequency lines 112' are separated for generation of the polarization control feedback signal 127, the receiver clock 128, and, optionally, the local oscillator signals 129. As illustrated in FIG. 8, the clock synchronization and polarization tracking subsystem 800 may include a demultiplexer 810, a pair of optical amplifiers 820-1 and 820-2 (collectively, optical amplifiers 820), a polarizer 830, a photodetector (PD) 840, a combiner 850, a PD 860, an electrical filter 870, an optical frequency lines regeneration subsystem 880, and a demultiplexer 890.

The demultiplexer 810 receives the received signal 122 and demultiplexes the received signal 122 to extract the pilot optical frequency lines 112' (C1 and C2), respectively. The demultiplexer 810 may propagate the optical frequency lines 112' without amplification of the pilot optical frequency lines 112' (in which case the optical amplifiers 820 may not be present) or may propagate the pilot optical frequency lines 112' to the optical amplifiers 820 for amplification before the pilot optical frequency lines 112' are further propagated for generation of the polarization control feedback signal 127, the receiver clock 128, and, optionally, the local oscillator signals 129.

The optical amplifiers 820 may receive the pilot optical frequency lines 112' and amplify the pilot optical frequency lines 112' to provided amplified versions of the pilot optical frequency lines 112' for generation of the polarization control feedback signal 127, the receiver clock 128, and, optionally, the local oscillator signals 129. More specifically, the optical amplifier 820-1 amplifies the pilot optical frequency line C1 from the demultiplexer 810 and the optical amplifier 820-2 amplifies the pilot optical frequency line C12 from the demultiplexer 810. It will be appreciated that, as indicated above, the optical amplifiers 820 may or may not be present or used for amplifying the pilot optical frequency lines 112'.

The polarization control feedback signal 127, which is used by the polarization controller (omitted for purposes of clarity), may be generated using either of the pilot optical frequency lines 112'. In the example of FIG. 8, the pilot optical frequency line C2 is used to generate the polarization control feedback signal 127; however, it will be appreciated that, alternatively, the pilot optical frequency line C1 may be used to generate the polarization control feedback signal 127. The pilot optical frequency line C2 is sent through the polarizer 830 and detected on the PD 840, with the signal power of the resulting DC signal being used as the polarization control feedback signal 127 for the polarization controller. It is noted that, since polarizations are orthogonal, maximizing the power through the polarizer 730 indicates that the polarization controller is set properly to achieve polarization demultiplexing.

The pilot optical frequency lines 112' also are used for generation of the receiver clock 128. The pilot optical frequency lines 112' from the demultiplexer 810 are combined by a combiner 850 which has two input branches (connected for receiving the two pilot optical frequency lines 112', respectively) and two output branches. For example, the combiner 850 may be a 2×2 optical coupler. One of the output branches is used for generation of the receiver clock 128 (with the other optionally being used for generation of the local oscillator signals 129, as discussed further below). The output branch sends the combined signal to the PD 860. The combined signal is detected on the PD 860 to recover the optical frequency line spacing, and then the detected fundamental tone (or its harmonic) is electrically filtered by the electrical filter 870. The filtered signal output by the electrical filter 870 is converted by a clock converter 871 based on a conversion factor (indicated by a known ratio (K), which may indicate multiplication or division in accordance with the conversion factor) to generate the receiver clock 128 which, by the virtue of being locked to the transmitter clock 113, is also synchronized with the reference clock, thereby also locking the receiver clock 128 to the reference clock.

The pilot optical frequency lines 112', in the case of homodyne operation, also are used for generation of the local oscillator signals 129. The pilot optical frequency lines 112' from the optical BPFs 810 are combined by a combiner 850 which has two input branches (connected for receiving the two pilot optical frequency lines 112', respectively) and two output branches. For example, the combiner 850 may be a 2×2 optical coupler. One of the output branches is used for generation of the local oscillator signals 129 (with the other optionally being used for generation of the receiver clock 128, as discussed further above). The output branch sends the combined signal to the optical frequency line regeneration subsystem 880. The regeneration of the local oscillator signals 129 from the pilot optical frequency lines 112' may be performed in various ways. For example, in at least some example embodiments, only one of the pilot optical frequency lines 112' (C1 or C2) is demultiplexed and used, along with the optionally bandpass filtered fundamental tone, to regenerate receiver-side optical frequency lines with lines matching at least some of the center wavelengths of data signals sent from the transmitter. The local oscillator signals 129 (which also may be referred to as regenerated lines $f'_1$-$f'_p$, where the value "P" may or may not be equal to the value "N" of the optical carrier signals 114 which are denoted as $f_1$-$f_N$, since there may be support for a mix of homodyne detection and non-homodyne reception (e.g., coherent heterodyne detection, coherent intradyne detection, direct detection, or the like)) are then demultiplexed by the demultiplexer 890 to act as the LO for coherent homodyne detection.

It will be appreciated that clock synchronization and polarization tracking subsystem 800 may be implemented in other ways for using the received signal 122 to generate the polarization control feedback signal 127, the receiver clock 128, and, optionally, the local oscillator signals 129.

Figure 9:
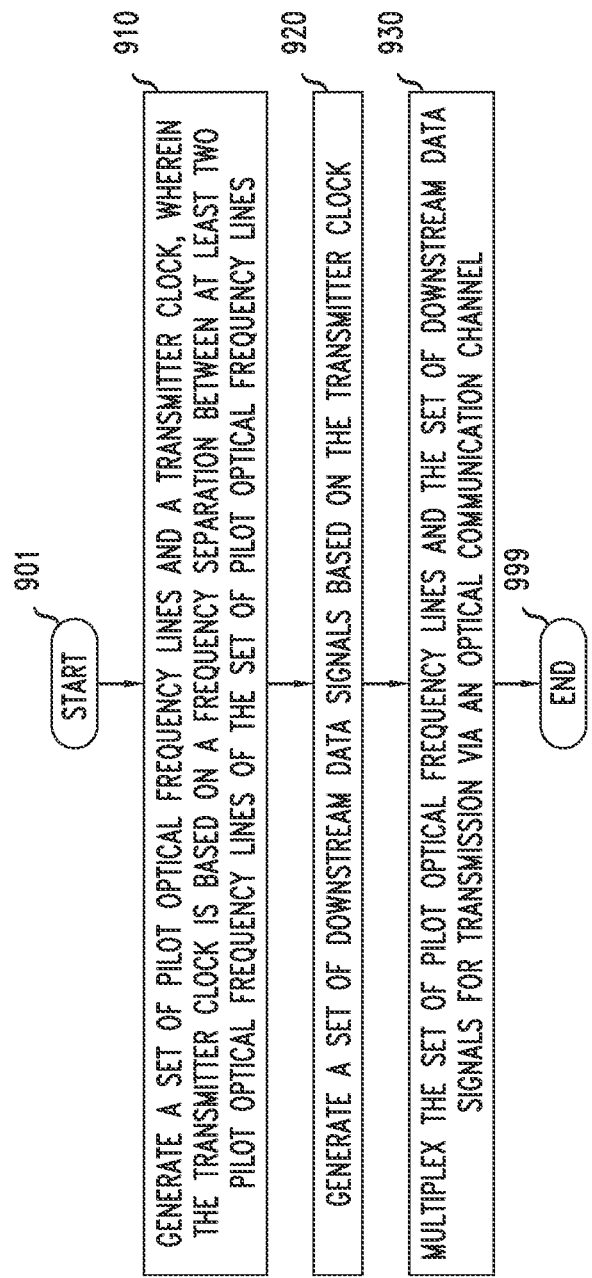
FIG. 9 depicts an example embodiment of a method for use by a transmitter for supporting clock recovery and polarization tracking based on a set of pilot optical frequency lines.

FIG. 9 depicts an example embodiment of a method for use by a transmitter for supporting clock recovery and polarization tracking based on a set of pilot optical frequency lines. It will be appreciated that, although primarily presented as being performed serially, at least a portion of the functions of the method 900 may be performed contemporaneously or in a different order than as presented with respect to FIG. 9. At block 901, method 900 begins. At block 910, generate a set of pilot optical frequency lines and a transmitter clock, wherein the transmitter clock is based on a frequency separation between at least two pilot optical frequency lines of the set of pilot optical frequency lines. At block 920, generate a set of downstream data signals based on the transmitter clock. At block 930, multiplex the set of pilot optical frequency lines and the set of downstream data signals for transmission via an optical communication channel. At block 999, the method 900 ends. It will be appreciated that various functions presented herein with respect to FIGS. 1 and 2-5 may be incorporated within the context of method 900 of FIG. 9.

Figure 10:
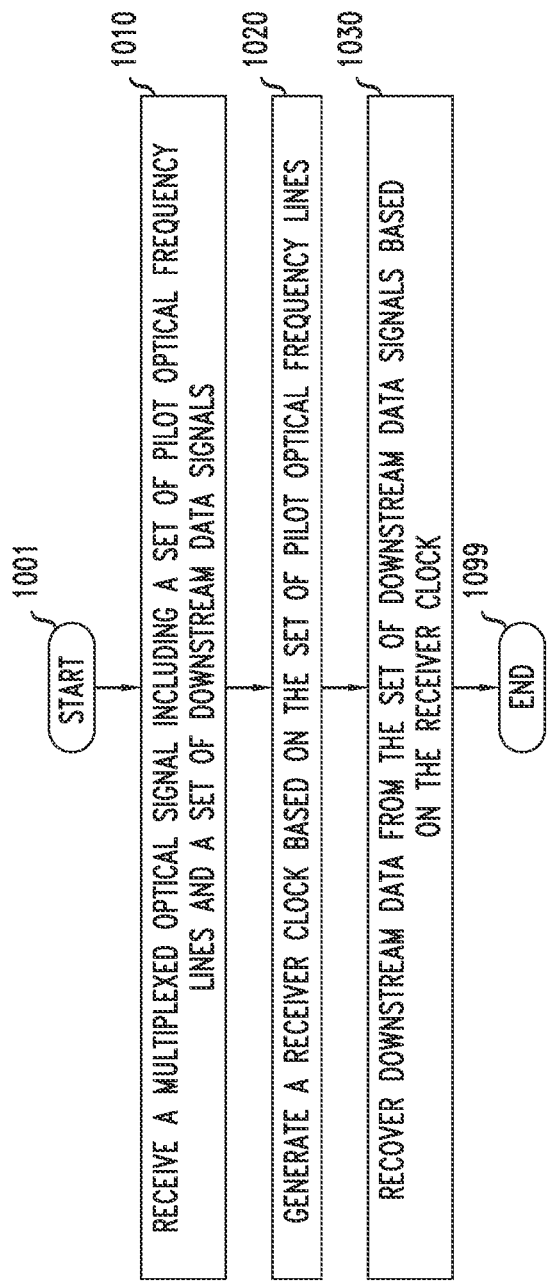
FIG. 10 depicts an example embodiment of a method for use by a receiver for supporting clock recovery and polarization tracking based on a set of pilot optical frequency lines.

FIG. 10 depicts an example embodiment of a method for use by a receiver for supporting clock recovery and polarization tracking based on a set of pilot optical frequency lines. It will be appreciated that, although primarily presented as being performed serially, at least a portion of the functions of the method 1000 may be performed contemporaneously or in a different order than as presented with respect to FIG. 10. At block 1001, method 1000 begins. At block 1010, receive a multiplexed optical signal including a set of pilot optical frequency lines and a set of downstream data signals. At block 1020, generate a receiver clock based on the set of pilot optical frequency lines. At block 1030, recover downstream data from the set of downstream data signals based on the receiver clock. At block 1099, the method 1000 ends. It will be appreciated that various functions presented herein with respect to FIGS. 1 and 6-8 may be incorporated within the context of method 1000 of FIG. 10.

Figure 11:
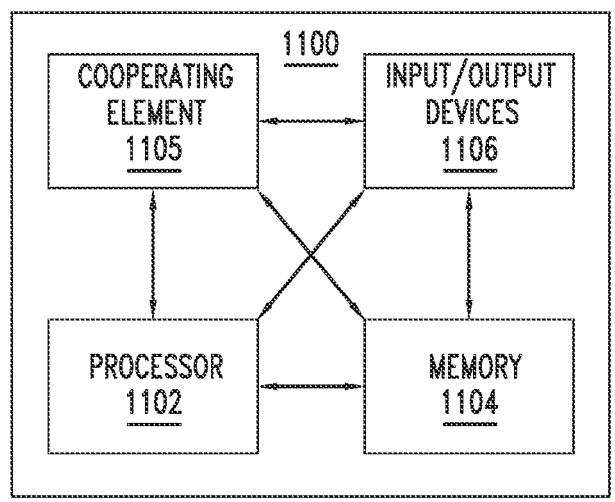
FIG. 11 depicts an example embodiment of a computer suitable for use in performing various functions presented herein.

FIG. 11 depicts an example embodiment of a computer suitable for use in performing various functions presented herein.

The computer 1100 includes a processor 1102 (e.g., a central processing unit (CPU), a processor, a processor having a set of processor cores, a processor core of a processor, or the like) and a memory 1104 (e.g., a random access memory (RAM), a read-only memory (ROM), or the like). In at least some example embodiments, the computer 1100 may include at least one processor and at least one memory storing instructions that, when executed by the at least one processor, cause the computer to perform various functions presented herein.

The computer 1100 also may include a cooperating element 1105. The cooperating element 1105 may be a hardware device. The cooperating element 1105 may be a process that can be loaded into the memory 1104 and executed by the processor 1102 to implement various functions presented herein (in which case, for example, the cooperating element 1105 (including associated data structures) can be stored on a non-transitory computer readable medium, such as a storage device or other suitable type of storage element (e.g., a magnetic drive, an optical drive, or the like)).

The computer 1100 also may include one or more input/output devices 1106. The input/output devices 1106 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1100 may represent a general architecture and functionality suitable for implementing functional elements described herein, portions of functional elements described herein, or the like, as well as various combinations thereof. For example, the computer 1100 may provide a general architecture and functionality that is suitable for implementing one or more elements presented herein. For example, the computer 1100 may provide a general architecture and functionality that is suitable for implementing at least one of one or more elements (or a portion(s) thereof) of a transmitter, one or more elements (or a portion(s) thereof) of a receiver, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a subsystem configured to generate a set of pilot optical frequency lines and a transmitter clock, wherein the transmitter clock is based on a frequency separation between at least two pilot optical frequency lines of the set of pilot optical frequency lines;
a set of transmitter subsystems configured to generate a set of downstream data signals based on the transmitter clock; and
a multiplexer configured to multiplex the set of pilot optical frequency lines and the set of downstream data signals for transmission via an optical communication channel.

2. The apparatus of claim 1, wherein the set of pilot optical frequency lines is configured to carry clock information configured for use in generating a receiver clock at a receiver of the communication channel.

3. The apparatus of claim 1, wherein the subsystem is configured to generate the set of pilot optical frequency lines and the transmitter clock based on a reference clock.

4. The apparatus of claim 3, wherein the subsystem is configured to generate the set of pilot optical frequency lines by converting the reference clock, based on a conversion factor, to form a drive signal used for generation of a set of optical frequency lines that at least includes the set of pilot optical frequency lines.

5. The apparatus of claim 3, wherein the subsystem is configured to generate the transmitter clock by converting the reference clock, based on a conversion factor, to provide the transmitter clock.

6. The apparatus of claim 1, wherein the subsystem is configured to generate a set of optical frequency lines that includes the set of pilot optical frequency lines, wherein the subsystem is configured to generate the transmitter clock based on at least a portion of the optical frequency lines in the set of optical frequency lines.

7. The apparatus of claim 1, wherein the subsystem is configured to generate a set of optical frequency lines that includes a set of communication optical frequency lines and the set of pilot optical frequency lines, wherein the transmitter subsystems are configured to generate the downstream data signals based on use of the communication optical frequency lines as optical carrier signals.

8. The apparatus of claim 1, wherein the multiplexer is configured to perform polarization multiplexing of the downstream data signals.

9. The apparatus of claim 1, wherein the transmitter clock is synchronized to a symbol rate of the downstream data signals.

10. The apparatus of claim 1, wherein the apparatus is configured for use in an optical line terminal (OLT).

11. A method, comprising:
generating a set of pilot optical frequency lines and a transmitter clock, wherein the transmitter clock is based on a frequency separation between at least two pilot optical frequency lines of the set of pilot optical frequency lines;
generating a set of downstream data signals based on the transmitter clock; and
multiplexing the set of pilot optical frequency lines and the set of downstream data signals for transmission via an optical communication channel.

12. An apparatus, comprising:
a subsystem configured to receive a multiplexed optical signal including a set of pilot optical frequency lines and a set of downstream data signals, and generate a receiver clock based on the set of pilot optical frequency lines; and
a set of receiver subsystems configured to receive the set of downstream data signals and recover downstream data from the set of downstream data signals based on the receiver clock.

13. The apparatus of claim 12, wherein the set of pilot optical frequency lines is configured to carry clock information configured for use in generating the receiver clock.

14. The apparatus of claim 12, wherein the subsystem is configured to generate the receiver clock based on a frequency separation between the pilot optical frequency lines in the set of optical frequency lines.

15. The apparatus of claim 12, wherein the receiver clock is correlated to a transmitter clock used for generation of the downstream data signals.

16. The apparatus of claim 12, wherein the subsystem is configured to generate a set of communication optical frequency lines based on at least a portion of the pilot optical frequency lines in the set of pilot optical frequency lines, wherein the receiver subsystems are configured to recover the downstream data from the downstream data signals based on use of the communication optical frequency lines as local oscillator signals.

17. The apparatus of claim 12, wherein the subsystem is configured to generate a polarization control feedback signal based on at least a portion of the pilot optical frequency lines in the set of pilot optical frequency lines, wherein the subsystem is configured to provide the polarization control feedback signal to a polarization controller configured to align polarization state of the downstream data signals based on the polarization control feedback signal.

18. The apparatus of claim 12, wherein the receiver clock is synchronized to a symbol rate of the downstream data signals.

19. The apparatus of claim 12, wherein the apparatus is configured for use in an optical network unit (ONU).

20. A method, comprising:
receiving a multiplexed optical signal including a set of pilot optical frequency lines and a set of downstream data signals;
generating a receiver clock based on the set of pilot optical frequency lines; and
recovering downstream data from the set of downstream data signals based on the receiver clock.

* * * * *